(12) United States Patent
Yoon et al.

(10) Patent No.: US 10,955,177 B2
(45) Date of Patent: Mar. 23, 2021

(54) AIR CONDITIONER AND METHOD FOR CONTROLLING THE SAME

(71) Applicant: SAMSUNG ELECTRONICS CO., LTD., Suwon-si (KR)

(72) Inventors: Hyun Jin Yoon, Suwon-si (KR); Je Hyeon Lee, Suwon-si (KR); Tae Duk Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 288 days.

(21) Appl. No.: 15/945,366

(22) Filed: Apr. 4, 2018

(65) Prior Publication Data

US 2018/0283752 A1  Oct. 4, 2018

(30) Foreign Application Priority Data

Apr. 4, 2017 (KR) .................. 10-2017-0043785

(51) Int. Cl.
*F25B 49/02* (2006.01)
*F25B 13/00* (2006.01)

(52) U.S. Cl.
CPC .............. *F25B 49/02* (2013.01); *F25B 13/00* (2013.01); *F25B 2313/025* (2013.01); *F25B 2313/0233* (2013.01); *F25B 2313/0294* (2013.01); *F25B 2400/075* (2013.01); *F25B 2500/19* (2013.01); *F25B 2600/027* (2013.01); *F25B 2600/0253* (2013.01); *F25B 2600/111* (2013.01); *F25B 2700/02* (2013.01); *F25B 2700/171* (2013.01); *F25B 2700/1931* (2013.01); *F25B 2700/1933* (2013.01); *F25B 2700/21151* (2013.01);

(Continued)

(58) Field of Classification Search
CPC .................................. F25B 49/02; F25B 13/00
See application file for complete search history.

(56) References Cited

U.S. PATENT DOCUMENTS 2,179,700 A * 11/1939 Miller .................. F25B 49/022
62/209
2003/0019221 A1  1/2003 Rossi et al.

(Continued)

FOREIGN PATENT DOCUMENTS

JP  2001-174097  6/2001
JP  2007-278618  10/2007

(Continued)

OTHER PUBLICATIONS

PCT International Search Report issued in PCT/KR2018/003714 dated Jul. 24, 2018 (3 total pages).

(Continued)

*Primary Examiner* — Cassey D Bauer
(74) *Attorney, Agent, or Firm* — Staas & Halsey, LLP

(57) ABSTRACT

An air conditioner and a control method for the same, the air conditioner including an air conditioning unit including a compressor, a first heat exchanger, an expansion valve, and a second heat exchanger; and a controller configured to obtain enthalpy of a refrigerant flowing in the air conditioning unit, obtain an air conditioning capacity using a circulation amount of the refrigerant and the obtained enthalpy of the refrigerant, obtain efficiency based on the obtained air conditioning capacity and supplied power, and control the air conditioning unit according to the obtained efficiency.

8 Claims, 18 Drawing Sheets

(52) U.S. Cl.
CPC .............. *F25B 2700/21152* (2013.01); *F25B 2700/21163* (2013.01); *Y02B 30/70* (2013.01)

(56) References Cited

U.S. PATENT DOCUMENTS

| | | | |
|---|---|---|---|
| 2008/0245083 A1 | 10/2008 | Tutunoglu et al. | |
| 2009/0217679 A1* | 9/2009 | Raghavachari | F25B 49/02 |
| | | | 62/77 |
| 2011/0257794 A1* | 10/2011 | Nishino | F24F 11/30 |
| | | | 700/277 |
| 2014/0140810 A1* | 5/2014 | Balistreri | F25B 49/027 |
| | | | 415/1 |
| 2016/0123784 A1* | 5/2016 | Brattoli | G01F 9/001 |
| | | | 702/182 |
| 2016/0356534 A1 | 12/2016 | Hatada et al. | |

FOREIGN PATENT DOCUMENTS

| | | |
|---|---|---|
| JP | 2008-057818 | 3/2008 |
| JP | 2009-150640 | 7/2009 |
| JP | 5394047 | 1/2014 |
| JP | 2017-026308 | 2/2017 |
| KR | 10-2008-0095998 | 10/2008 |
| KR | 10-2015-0057624 | 5/2015 |

OTHER PUBLICATIONS

Extended European Search Report dated May 13, 2020 in European Patent Application No. 18781571.7.
Chinese Office Action dated Dec. 1, 2020 in Chinese Patent Application No. 201810301536.5.

\* cited by examiner

FIG. 10

| MODE | MODE | PRESSURE CHANGE | CAPACITY CHANGE | EFFICIENCY CHANGE |
|---|---|---|---|---|
| COOLING MODE | LOW PRESSURE CONTROL | LOW PRESSURE ↑ | COOLING CAPACITY ↓ | EFFICIENCY ↑ |
| | | LOW PRESSURE ↓ | COOLING CAPACITY ↑ | EFFICIENCY ↓ |
| HEATING MODE | LOW PRESSURE CONTROL | HIGH PRESSURE ↑ | HEATING CAPACITY ↑ | EFFICIENCY ↓ |
| | | HIGH PRESSURE ↓ | HEATING CAPACITY ↓ | EFFICIENCY ↑ |

FIG. 17

| OUTDOOR UNIT | FIRST OUTDOOR UNIT | FIRST OUTDOOR UNIT | FIRST OUTDOOR UNIT |
|---|---|---|---|
| EFFICIENCY | S1 | S1 | S1 |
| OUTDOOR UNIT | FIRST OUTDOOR UNIT + SECOND OUTDOOR UNIT | FIRST OUTDOOR UNIT + THIRD OUTDOOR UNIT | SECOND OUTDOOR UNIT + THIRD OUTDOOR UNIT |
| EFFICIENCY | S2 | S4 | S4 |
| OUTDOOR UNIT | FIRST OUTDOOR UNIT + SECOND OUTDOOR UNIT + THIRD OUTDOOR UNIT | | |
| EFFICIENCY | S5 | | |

AIR CONDITIONER AND METHOD FOR CONTROLLING THE SAME

CROSS-REFERENCE TO RELATED APPLICATION

This application claims the benefit of Korean Patent Application No. 10-2017-0043785, filed on Apr. 4, 2017 in the Korean Intellectual Property Office, the disclosure of which is incorporated herein by reference.

BACKGROUND

1. Field

Embodiments of the present disclosure relate to an air conditioner and a method for controlling the same.

2. Description of the Related Art

Air conditioners, which are devices that control indoor air according to use purposes, are devices for controlling a temperature, moisture, cleanliness, or flow of indoor air. The air conditioners may be used in various places such as residential houses, offices, factories, and vehicles.

An air conditioner controls indoor air by discharging cooled air, which is obtained through a cooling cycle or a heating cycle generally including processes of compressing, condensing, expanding, and evaporating a refrigerant, into an indoor room. To this end, the air conditioner may include a compressor, a first heat exchanger, an expansion valve, a second heat exchanger, and a fan.

In the case of the cooling cycle, the refrigerant sequentially flows in the compressor, the first heat exchanger, the expansion valve, and the second heat exchanger. Particularly, the compressor of the air conditioner compresses a gaseous refrigerant, for example, Freon gas, and the second heat exchanger (a condenser) may condense the compressed refrigerant. The condensed refrigerant expands in the expansion valve and is changed into a state in which the condensed refrigerant can be easily evaporated. When the expanding refrigerant is evaporated in the second heat exchanger (an evaporator), the refrigerant absorbs ambient heat while being evaporated, and thus air around the second heat exchanger is cooled. The cooled air is discharged into an indoor space by a fan, and the temperature of indoor air is decreased. The refrigerant evaporated in the second heat exchanger is reintroduced into the compressor, and the above-described cooling cycle is repeatedly performed.

In the case of the heating cycle, the refrigerant sequentially flows in the compressor, the second heat exchanger, the expansion valve, and the first heat exchanger contrary to the above description, and heat condensed in the second heat exchanger and discharged to the outside is discharged to an indoor space by the fan, and thus the temperature of indoor air is increased.

SUMMARY

Therefore, it is an aspect of the present disclosure to provide an air conditioner which allows a cooling capacity or heating capacity of the air conditioner to be quickly and appropriately determined and efficiently controlled, operated, maintained, and repaired based on the determination, and a method of controlling the air conditioner.

Additional aspects of the disclosure will be set forth in part in the description which follows and, in part, will be apparent from the description, or may be learned by practice of the disclosure.

In accordance with one aspect of the present disclosure, an air conditioner comprising: an air conditioning unit including a compressor, a first heat exchanger, an expansion valve, and a second heat exchanger; and a controller configured to obtain enthalpy of a refrigerant flowing in the air conditioning unit, obtain an air conditioning capacity using a circulation amount of the refrigerant and the obtained enthalpy of the refrigerant, obtain efficiency based on the obtained air conditioning capacity and supplied power, and control the air conditioning unit according to the obtained efficiency.

The controller may calculate and obtains the circulation amount of the refrigerant using a first pressure of a refrigerant discharged from the compressor of the air conditioning unit, a second pressure of a refrigerant supplied to the compressor, a first temperature of the refrigerant supplied to the compressor, a second temperature of the refrigerant discharged from the compressor, an overcooling temperature, and a rotation frequency of the compressor.

The controller may determine whether an operation of the air conditioner is a cooling operation or a heating operation.

The obtained enthalpy of the refrigerant may include enthalpy of a refrigerant supplied to the second heat exchanger and enthalpy of a refrigerant discharged from the second heat exchanger when determining that the operation of the air conditioning unit is the cooling operation.

The obtained enthalpy of the refrigerant may include enthalpy of a refrigerant supplied to the first heat exchanger and enthalpy of a refrigerant discharged from the first heat exchanger when determining that the operation of the air conditioning unit is the heating operation.

The controller may control the efficiency of the air conditioning unit by controlling at least one of a first pressure of a refrigerant discharged from the compressor and a second pressure of a refrigerant supplied to the compressor according to the obtained efficiency.

The controller may control at least one of the first pressure and the second pressure further using indoor moisture.

The air conditioning unit further includes a fan configured to guide heat generated in the first heat exchanger to the outside; and The controller may further increase a rotation number of the fan when the efficiency is relatively decreased.

The controller may obtain the efficiency at least one point and stores the obtained efficiency at the at least one point in a storage unit.

The controller may determine a maintenance plan of the air conditioning unit based on the obtained efficiency at the at least one point.

In accordance with one aspect of the present disclosure, an air conditioner comprising: a first outdoor unit including a first compressor and a first heat exchanger and connected with at least one indoor unit; a second outdoor unit including a second compressor and a second heat exchanger and connected with the at least one indoor unit; and a controller configured to obtain first efficiency corresponding to the first outdoor unit and second efficiency corresponding to the second outdoor unit and control at least one of the first outdoor unit, the second outdoor unit, and the at least one indoor unit based on the obtained first efficiency and the obtained second efficiency.

The controller may obtain a first air conditioning capacity corresponding to the first outdoor unit and a second air conditioning capacity corresponding to the second outdoor unit and obtains the first efficiency and the second efficiency based on the obtained first air conditioning capacity and the obtained second air conditioning capacity.

The controller may compare the obtained first efficiency with the obtained second efficiency and controls an operation of at least one of the first outdoor unit and the second outdoor unit based on the comparison result; or The controller may determine a priority of operations of the first outdoor unit and the second outdoor unit according to the comparison result of the obtained first efficiency and the obtained second efficiency.

In accordance with one aspect of the present disclosure, a method of controlling an air conditioner, the method comprising: obtaining enthalpy of a refrigerant flowing in an air conditioning unit; obtaining a circulation amount of a refrigerant supplied to a second heat exchanger of the air conditioning unit; obtaining an air conditioning capacity of the air conditioning unit using the obtained enthalpy of the refrigerant and the obtained circulation amount of the refrigerant; obtaining efficiency based on the obtained air conditioning capacity and the supplied power; and controlling the air conditioning unit according to the obtained efficiency.

The obtaining of the circulation amount of refrigerant of the air conditioning unit may include calculating and obtaining the circulation amount of the refrigerant using a first pressure of a refrigerant discharged from a compressor of the air conditioning unit, a first temperature of a refrigerant discharged from the compressor, a second temperature of the refrigerant discharged to the compressor, an overcooling temperature, and a rotation frequency of the compressor.

The method may further comprise determining whether an operation of the air conditioning unit is a cooling operation or a heating operation, The obtained enthalpy of the refrigerant may include enthalpy of the refrigerant supplied to the second heat exchanger and enthalpy of a refrigerant discharged from the second heat exchanger when determining that the operation of the air conditioning unit is the cooling operation.

The obtained enthalpy of the refrigerant may include enthalpy of a refrigerant supplied to the first heat exchanger and enthalpy of a refrigerant discharged from the first heat exchanger when determining that the operation of the air conditioning unit is the heating operation.

The method may further comprise storing the obtained efficiency; and determining a maintenance plan of the air conditioning unit based on the obtained efficiency.

The controlling the air conditioning unit according to the obtained efficiency may include controlling the efficiency of the air conditioning unit by controlling at least one of a first pressure of a refrigerant discharged from the compressor and a second pressure of a refrigerant supplied to the compressor according to the obtained efficiency.

The method may further comprise additionally increasing a rotation number of a fan configured to guide heat generated in a first heat exchanger to the outside when the efficiency is relatively decreased.

The air conditioning unit may include a first outdoor unit and a second outdoor unit connected with at least one indoor unit; and The obtaining of the efficiency based on the obtained air conditioning capacity and the supplied power may include obtaining first efficiency corresponding to the first indoor unit and second efficiency corresponding to the second outdoor unit.

The controlling of the air conditioning unit according to the obtained efficiency may include at least one of: comparing the first efficiency obtained with the second efficiency obtained and controlling an operation of any one of the first outdoor unit and the second outdoor unit based on the comparison result; and determining a priority of operations of the first outdoor unit and the second outdoor unit according to the comparison result of the obtained first efficiency and the obtained second efficiency.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 10 is a table for describing an example of a relation between air conditioning efficiency and capacity.

FIG. 17 is a view for describing a process of selecting an optimally efficient outdoor unit.

DETAILED DESCRIPTION

Hereinafter, various embodiments of an air conditioner will be described in detail with reference to FIGS. 1 to 17.

Figure 1:
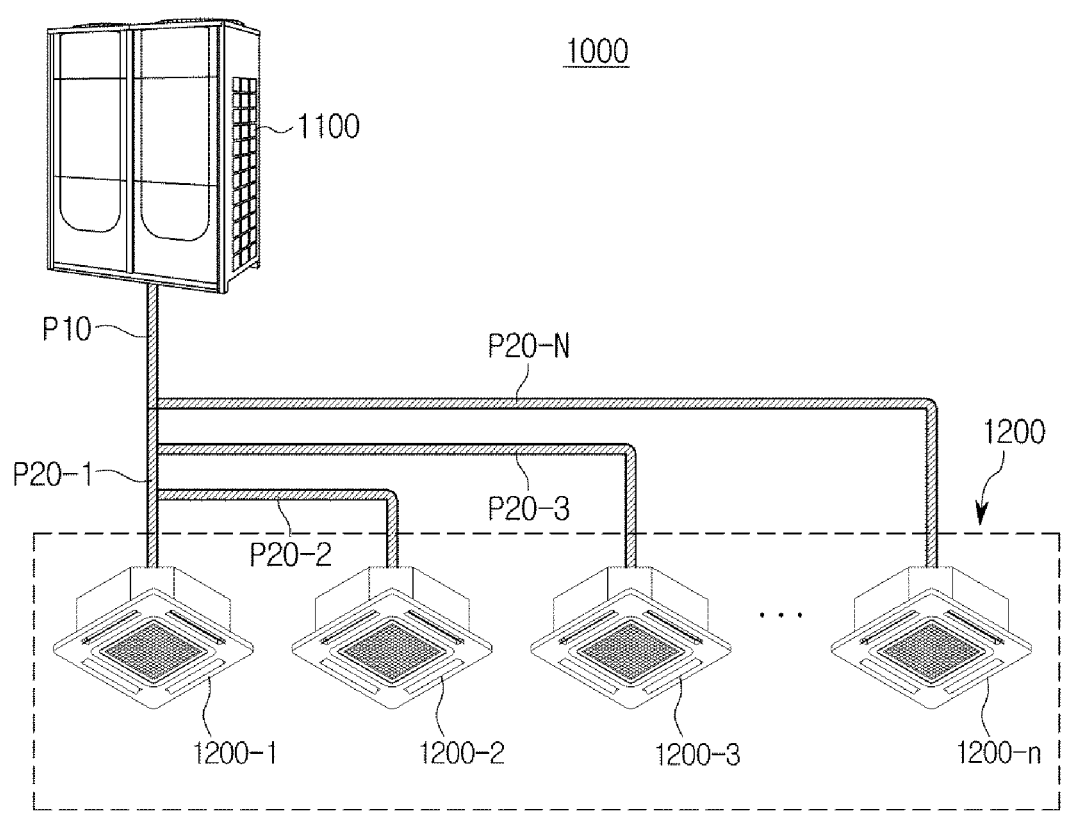
FIG. 1 is an overall view showing one embodiment of the air conditioner.

FIG. 1 is an overall view showing one embodiment of the air conditioner.

Referring to FIG. 1, an air conditioner 1000 according to one embodiment includes at least one outdoor unit 1100 and at least one indoor unit 1200 (1200-1 to 1200-N and, here and below, N refers to a natural number which is 1 or higher) connected with the outdoor unit 1100 through at least one pipe p10 (p20-1 to p20-N). The outdoor unit 1100 is generally installed in an outdoor space, and the indoor unit 1200 (1200-1 to 1200-N) is installed in at least one indoor space in which air is controlled. In this case, one indoor unit 1200 (one of the indoor units 1200-1 to 1200-N) may be installed in one indoor space, or the plurality of indoor units 1200-1 to 1200-N (1200) may be installed in one indoor space.

The air conditioner 1000 may be provided to provide cold air (hereinafter, an cooling operation) or warm air (hereinafter, a heating operation) to each of the indoor spaces corresponding to each of the indoor units 1200-1 to 1200-N (1200) using a refrigerant flowing between the indoor units 1200-1 to 200-N (1200) through at least one pipe p10 (p20-1 to p20-N). Since the cold air or warm air is provided to the indoor spaces corresponding to the indoor units 1200-1 to 200-N (1200), the temperature of air in the indoor space is controlled. In this case, the cooling operation and the heating operation may be selectively performed according to a predetermined setting or a user's operation.

The refrigerant may be introduced into the plurality of indoor units 1200-1 to 1200-N (1200), or may be selectively introduced into only some of the plurality of indoor units 1200-1 to 1200-N (1200). Therefore, the air conditioner 1000 may control air in all indoor spaces in which the plurality of indoor units 1200-1 to 1200-N (1200) are installed or may control air in some parts of the indoor spaces.

According to one embodiment, the refrigerant may include a halogen compound refrigerant such as chlorofluorocarbon (CFC), a hydrocarbon refrigerant, carbon dioxide, ammonia, water, air, an azeotropic refrigerant mixture, chloromethyl or the like. In addition, the refrigerant may include at least one of various materials considered by those skilled in the art.

The outdoor unit 10 is provided in the outdoor space and performs heat exchange between outdoor air and the refrigerant. The outdoor unit 10 may perform a cooling operation or a heating operation based on at least one of a predetermined setting and user selection.

Figure 2:
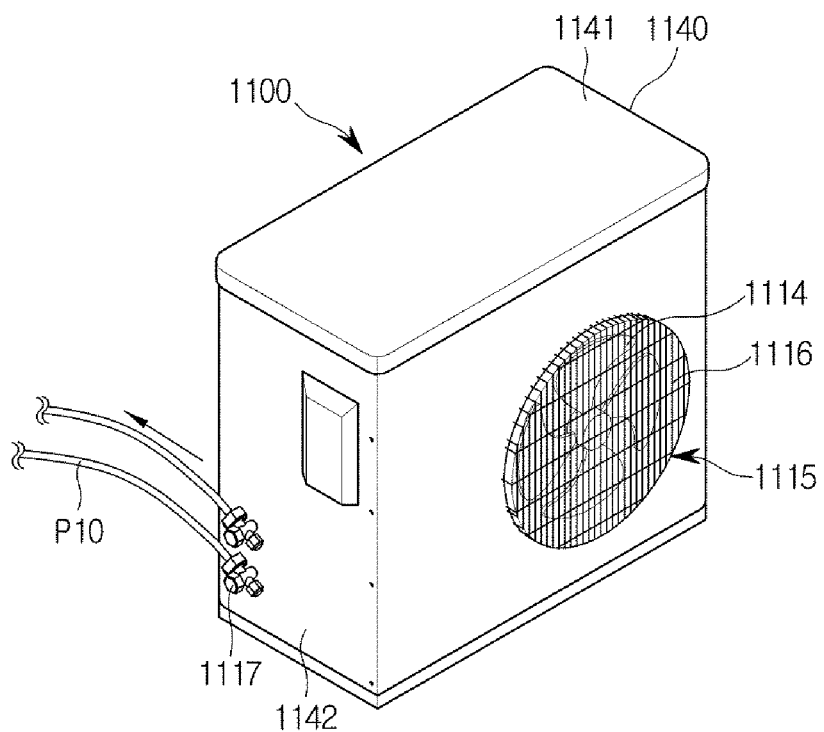
FIG. 2 is a perspective view showing one embodiment of the outdoor unit.
Figure 3:
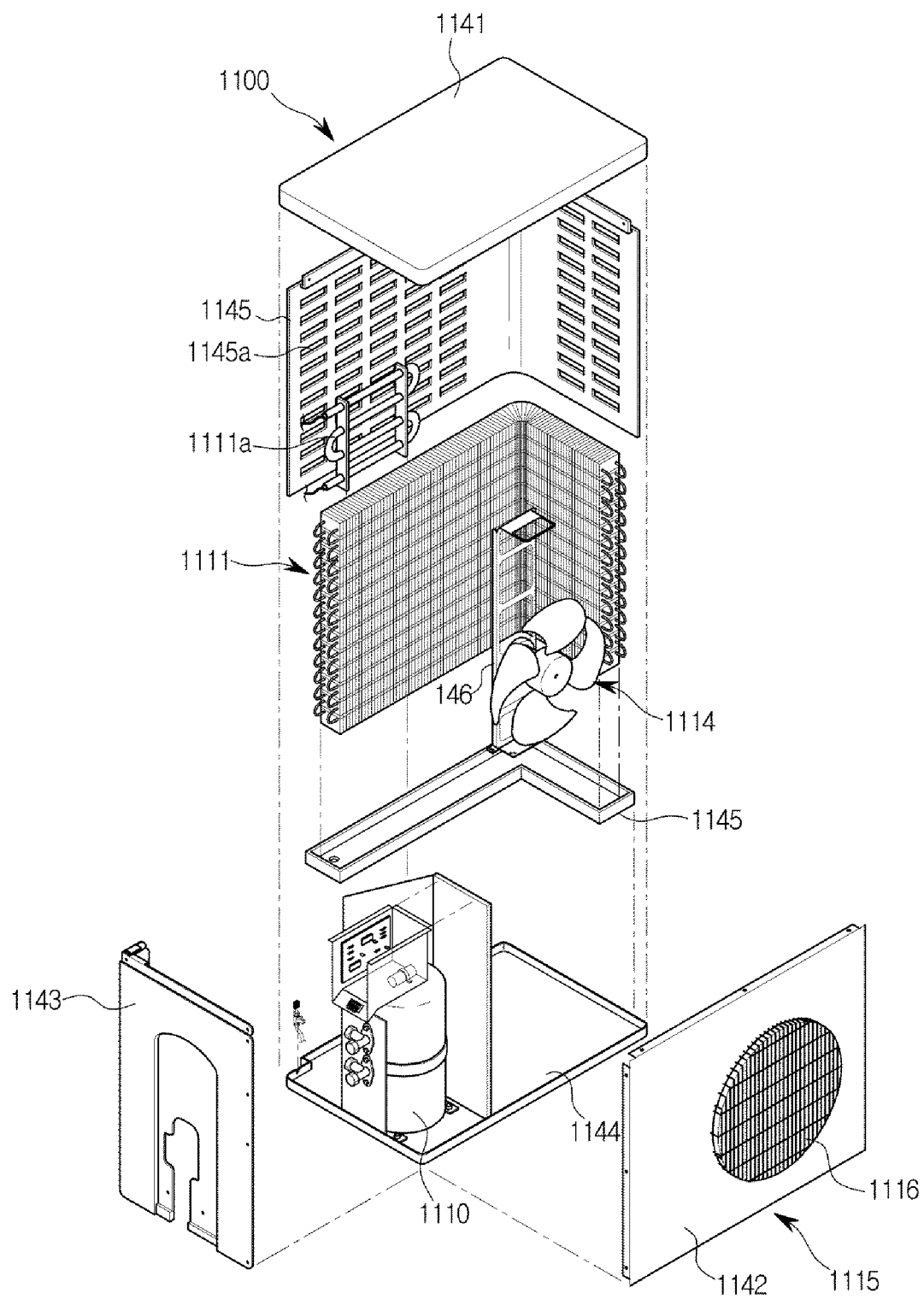
FIG. 3 is an exploded perspective view showing one embodiment of the outdoor unit.
Figure 4:
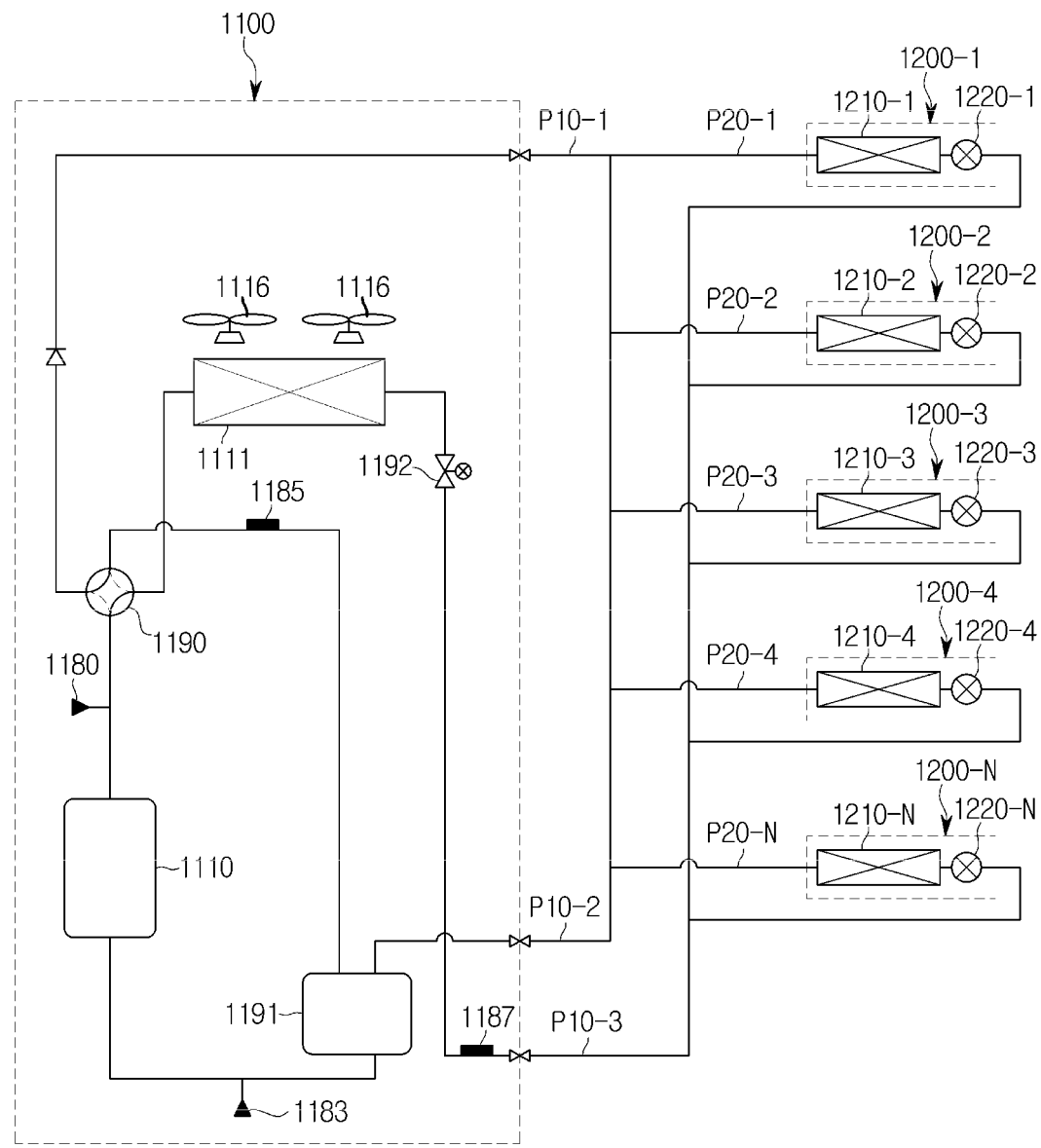
FIG. 4 is a schematic view showing one embodiment of the air conditioner that performs one-stage-compression.

FIG. 2 is a perspective view showing one embodiment of the outdoor unit, and FIG. 3 is an exploded perspective view showing one embodiment of the outdoor unit. FIG. 4 is a schematic view showing one embodiment of the air conditioner that performs one-stage-compression.

Referring to FIGS. 2 and 3, in one embodiment, the outdoor unit 1100 may include a compressor 1110 for increasing a pressure of supplied refrigerant by compressing the supplied refrigerant, a first heat exchanger 1111 for condensing or evaporating the refrigerant by performing heat exchange with outdoor air, an outdoor unit fan 1114 for discharging heat or cold air generated in the second heat exchanger 1210 (1210-1 to 1210-N) to the outside, a refrigerant path (not shown) guiding a refrigerant flow among the compressor 1110, the first heat exchanger 1111 and other components, and an outer housing 1140 in which various components, such as the compressor 1110, the first heat exchanger 1111, the outdoor unit fan 1114, the refrigerant path and the like, are installed.

The outer housing 1140 may include an upper housing 1141, a front housing 1142, a side housing 1143, a lower housing 1144 and a rear housing 1145. The housings 1141 to 1145 are coupled to each other to form an exterior of the outdoor unit 1100 and are provided so that various components of the outdoor unit 1100 are disposed therein. According to an embodiment of the present disclosure, at least two of the upper housing 1141, the front housing 1142, the side housing 1143, the lower housing 1144 and the rear housing 1145 may be integrally formed.

An air vent 1115 is provided in the front housing 1142 so that air in the outer housing 1140 is discharged to the outside, and the outdoor unit fan 1114 may be exposed to the outside through the air vent 1115. As necessary, a blocking net 1116 may be provided at a front surface of the air vent 1115 to prevent a direct contact with the outdoor unit fan 1114 from the outside.

A pipe connecting member may be formed at the side housing 1143 so that an external pipe is installed on the side housing 1143, and may be provided to be connected with the refrigerant path provided in the outer housing 1140.

A suction port 1145a may be formed in the rear housing 1145 so that the outdoor air is introduced into a space in the outer housing 1140, and the outdoor air introduced into the suction port 1145a may meet heat or cold air discharged from the first heat exchanger 1111 and may be discharged to the outside through the air vent 1115 again.

The outdoor unit fan 1114 may be installed at an outdoor unit fan supporting member 1146 toward the air vent 1115, and is coupled to a motor to be rotated in a predetermined direction. The motor is provided to be connected using at least one gear or is provided so that a driving shaft thereof is connected with a rotating shaft of the outdoor unit fan 1114 in a straight line so as to rotate the outdoor unit fan 1114. The outdoor unit fan 1114 is rotated according to a rotation speed of the driving shaft of the motor. The driving shaft of the motor may have a changeable rotation speed.

The compressor 1110 may suction a supplied refrigerant, and change the suctioned refrigerant into a high temperature and pressure gas and discharge the changed refrigerant. The compressor 1110 is connected with the refrigerant path connected with the external pipe and is connected with the first heat exchanger 1111 through at least one refrigerant path. The compressor 1110 may be implemented using a positive displacement compressor or a dynamic compressor, and may use various types of compressors considered by those skilled in the art.

The compressor 1110 may include a predetermined motor to change the refrigerant into the high temperature and pressure gas. The motor may be rotated at a predetermined frequency (hereinafter, a compressor frequency) according to a control of a controller 1300. A cooling capacity of the air conditioner 1000 may be determined according to the compressor frequency.

When an inverter air compressor is used as the compressor 1110, the compressor frequency may be changed. The change of the compressor frequency may be determined according to a control signal transmitted from the controller 1300. In this case, the controller 1300 may further store a compressor frequency included in the control signal transmitted to the motor of the compressor 1110 in a storage unit 1400.

Figure 6:
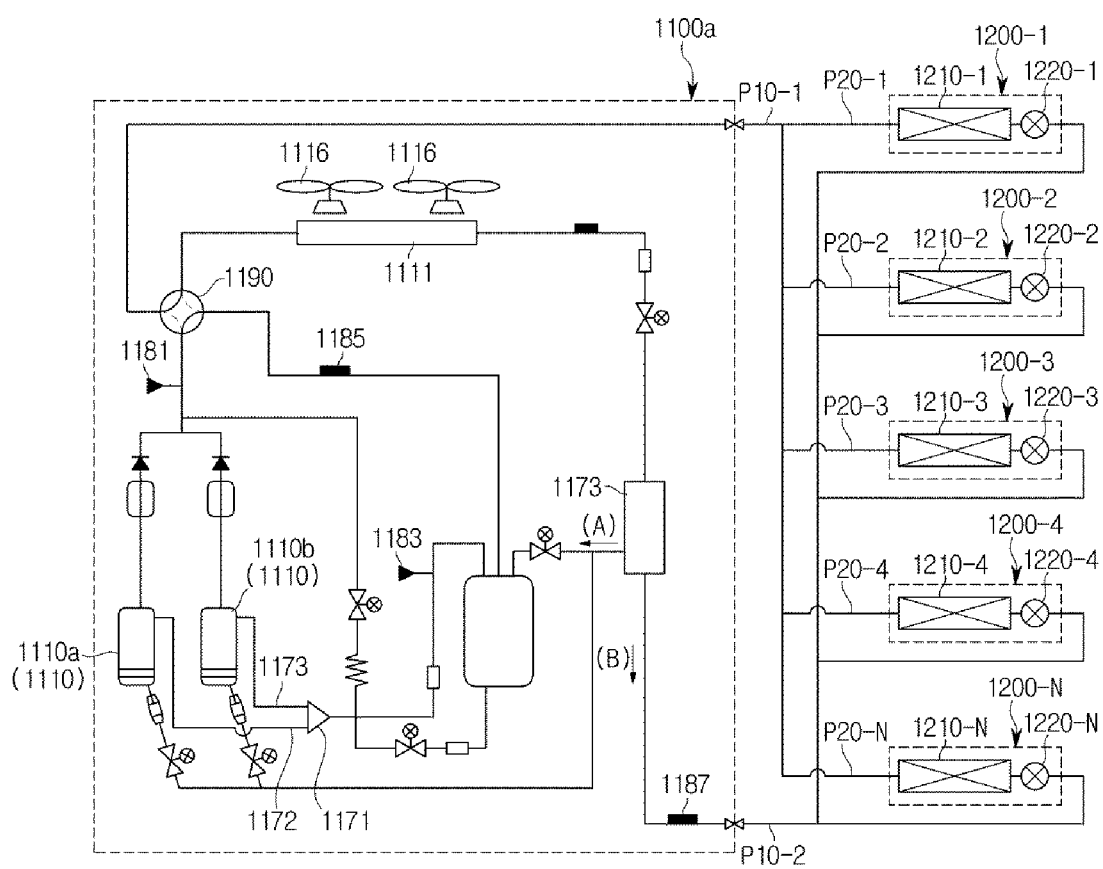
FIG. 6 is a schematic view showing one embodiment of the air conditioner performing two-stage-compression.

According to one embodiment, one outdoor unit 1100 may include a plurality of compressors 1110-1 and 1110-2 in FIG. 6. In this case, the outdoor unit 1100 may further include a distributor distributing a refrigerant into each of the compressors 1110-1 and 1110-2.

According to one embodiment, as shown in FIG. 4, the refrigerant discharged from the compressor 1110 may be transmitted to a four-way valve 1113.

The refrigerant may be transmitted to the first heat exchanger 1111 or may be transmitted to the first pipe p11 according to an operation state of the four-way valve 1113.

The four-way valve 1113 is a valve provided to determine a movement direction of the refrigerant flowing in the air conditioner 1000 by connecting any two of four outlets with each other and also connecting the remaining outlets with each other. The four-way valve 1113 may allow the air conditioner 1000 to perform a heating operation or a cooling operation according to an operation state. Particularly, when the four-way valve 1113 guides the refrigerant discharged from the heat exchanger 1111 in a direction of the first heat exchanger 111, the air conditioner 1000 performs a cooling operation, and when the four-way valve 1113 guides the refrigerant discharged from the heat exchanger 1111 in a direction of the first pipe p10, the air conditioner 1000 performs a heating operation.

The four-way valve 1113 may change a movement direction of the refrigerant according to a control of the controller 1300. In this case, information on operation of the four-way valve 1113, that is, an operation mode of the air conditioner, may be stored in the storage unit at a time of generation of a control signal or at another time, and the controller 1300 may realize whether the air conditioner 1000 performs a heating operation or a cooling operation by accessing to the operation mode of the storage unit.

When the air conditioner 1000 performs the cooling operation, the first heat exchanger 1111 may function as a condenser and liquefy a high temperature and pressure gaseous refrigerant into a high temperature and pressure liquid. In this case, the refrigerant discharges heat to the outside while being liquefied in the outdoor heat exchanger 1111, and thus the temperature of refrigerant is decreased. Further, when the air conditioner 1000 performs the heating operation, the first heat exchanger 1111 may function as an evaporator. In this case, the refrigerant absorbs ambient heat while being evaporated around the outdoor heat exchanger 1111, and thus the temperature of refrigerant may be increased.

The first heat exchanger 1111 may be formed using a cooling tube bent in a predetermined shape, for example, a zigzag shape. In this case, one end of the cooling tube may be connected with a refrigerant path connected with the compressor 1110. According to a design of a designer, the other end thereof may be connected with the refrigerant path connected with an electronic expansion valve 1220 (1220-1 to 1220-N, not shown) of the outdoor unit 1100 or may be connected with an external pipe.

The first heat exchanger 1111 may include various types of heat exchangers such as a water-cooled condenser, an evaporative condenser, an air-cooled condenser or the like. In addition, the first heat exchanger 1111 may use various types of condensers considered by a designer.

The refrigerant path may connect the compressor 1110, the first heat exchanger 1111, the outer pipe installed in the outdoor unit 1100 with each other, and may connect the various valves, such as the four-way valve, the electronic expansion valve and the like, as necessary. The outer pipe may be connected to the indoor unit 1200 (1200-1 to 1200-N).

As necessary, as shown in FIG. 4, the outdoor unit 1100 further includes an accumulator 1191 for preventing a liquid refrigerant from being introduced into the compressor 1110. The accumulator 1191 may separate an unevaporated liquid refrigerant from the evaporated gaseous refrigerant and may provide the gaseous refrigerant to the heat exchanger 1111.

Hereinbefore, the example of the outdoor unit 1100 has been described, but a physical structure of the outdoor unit is not limited to the above description and may vary according to an installation space, the number of connected indoor units 1200, a purpose or taste of a designer or the like.

The indoor units 1200-1 to 1200-N (1200) are separately installed in an indoor space and are provided to control an indoor temperature by discharging cold air or warm air to the indoor space.

According to one embodiment, the indoor units 1200-1 to 1200-N (1200) may have a predetermined form considered by a designer such as a wall-mounted indoor unit mounted on a wall, an upright indoor unit positioned in one indoor space, a window-mounted indoor unit installed in a window, a ceiling-mounted indoor unit installed on a ceiling or the like.

The indoor units 1200-1 to 1200-N (1200) connected with the outdoor unit 1100 may have the same shape or may have different shapes from each other, and some indoor units may have the same shape while the others may have the different shapes. For example, all of the indoor units 1200-1 to 1200-N (1200) may be a ceiling-mounted indoor unit, or some indoor units 1200-1 to 1200-N (1200) may be ceiling-mounted indoor units, other indoor units may be upright-type indoor units, and the others may be a wall-mounted indoor unit.

As shown in FIG. 3, the indoor units 1200-1 to 1200-N (1200) may include a second heat exchanger 1210 (1210-1 to 1210-N) and may further include the expansion valve 1220 (1220-1 to 1220-N) as necessary.

The second heat exchanger 1210 (1210-1 to 1210-N) is provided to discharge cold air or warm air. Particularly, in the case of the cooling operation, the refrigerant absorbs latent heat of air in the indoor unit 1200 and is evaporated while passing through the second heat exchanger 1210 (1210-1 to 1210-N) so as to reduce the temperature of the air in the indoor unit 1200. Therefore, the indoor heat exchanger 1211 may generate cold air. The generated cold air may be discharged to the indoor space through the fan provided in the indoor unit 1200 (1200-1 to 1200-N). On the contrary, in the case of the heating operation, the high temperature and pressure gaseous refrigerant passing through the second heat exchanger 1210 (1210-1 to 1210-N) is liquefied into a high temperature and pressure liquid, and thus heat is discharged to the outside. Therefore, the indoor heat exchanger 1211 may generate heat, and the generated heat may be discharged to the indoor space through the fan.

The indoor heat exchanger 1211 may include a path through which the refrigerant flows, and the path may be formed using a tube made of a metal or a synthetic resin. The tube may be bent a plurality of times to have a zigzag shape.

The expansion valve 1220 (1220-1 to 1220-N) may expand the condensed refrigerant. The expansion valve 1220 (1220-1 to 1220-N) may include, for example, an electronic expansion valve 1220 (1220-1 to 1220-N). According to one embodiment, the expansion valve 1220 (1220-1 to 1220-N) may be installed in the outdoor unit 1100, may be installed in the indoor units 1200-1 to 1200-N (1200), or may be installed at a predetermined position of a pipe connecting the outdoor unit 1110 with the indoor units 1200-1 to 1200-N (1200).

Hereinafter, a relation between a pressure and enthalpy when one-stage-compression is performed will be described.

Figure 5:
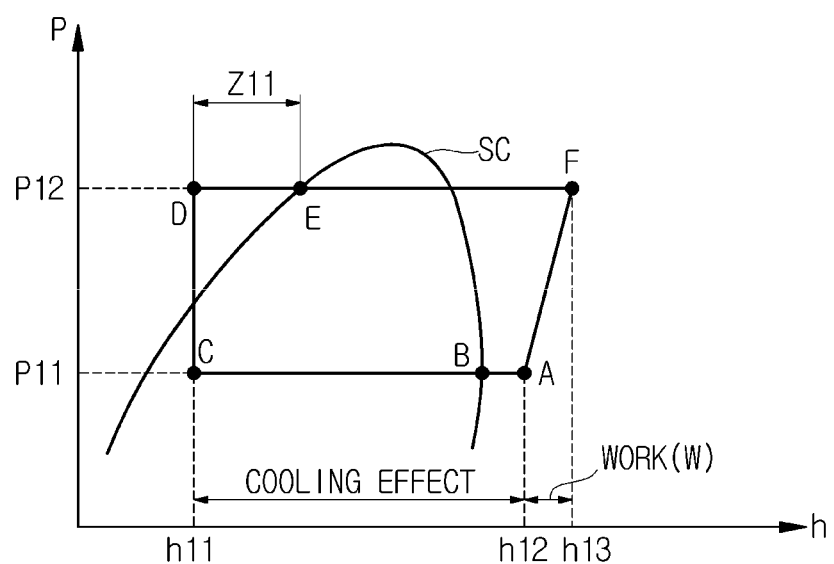
FIG. 5 is a graph showing a p-h graph when one-stage-compression is performed. An x-axis in FIG. 5 refers to enthalpy, and a y-axis refers to pressure.

FIG. 5 is a graph showing a p-h graph when one-stage-compression is performed. An x-axis in FIG. 5 refers to enthalpy, and a y-axis refers to pressure.

Referring to FIG. 4, when the air conditioner 1000 performs a cooling operation, a high temperature and pressure refrigerant compressed by the compressor 1110 is transmitted to the first heat exchanger 1111 through the refrigerant path and the four-way valve 1113, a refrigerant discharged from the first heat exchanger 1111 is returned to the heat exchanger 1111 through the refrigerant path by passing through the expansion valve, and the second heat exchanger 1210 (1210-1 to 1210-N). When compression is performed by the compressor 1110, as shown in FIG. 5, the pressure is increased from a first pressure p1 to a second pressure p2, and the enthalpy is increased from a first enthalpy h1 to a third enthalpy h3 (B-C section). The pressure is decreased to the first pressure p1 in the expansion valve 1220 (1220-1 to 1220-N) (D-A section). Therefore, as shown in FIG. 5, a relation between the pressure and the enthalpy in the cooling cycle has a rectangular shape. Meanwhile, when the air conditioner 1000 performs the heating operation, a change between the pressure and the enthalpy is generated in the opposite direction from that of the above-description.

A saturation curve SC is changed according to a temperature of indoor air, a temperature of outdoor air, and the like, and as shown in FIG. 5, has an upwardly convex shape according to the pressure (P) and the enthalpy (h). The saturation curve SC meets a straight line (a line segment BC) representing a change between the pressure P and the enthalpy h of the refrigerant in the first heat exchanger 1111 at a point, that is, an E point. In this case, a section z11 between the B and E points refers to an overcooled section. When the pressure P2 is not changed, a change between calorie and enthalpy is constant, and thus an overcooling temperature Tl is able to be measured using an enthalpy difference between the B and E points.

Figure 7:
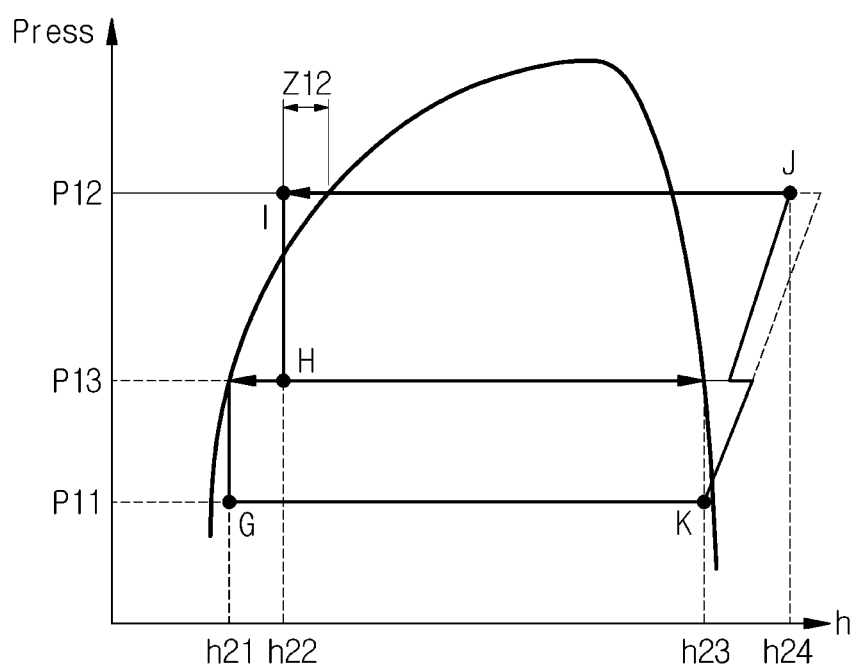
FIG. 7 is a graph showing a p-h graph when two-stage-compression is performed.

FIG. 6 is a schematic view showing one embodiment of the air conditioner performing two-stage-compression, and FIG. 7 is a graph showing a p-h graph when two-stage-compression is performed.

According to one embodiment, the air conditioner 1000-1 may perform two-stage-compression. Particularly, referring to FIG. 6, the air conditioner 1000-1 may include an outdoor unit 1100a including at least one compressor 1110 (1110-1 and 1110-2), a first heat exchanger 1111, and a four-way valve 1113, and an indoor unit 1200 (1200-1 to 1200-N) including a second heat exchanger 1210 (1210-1 to 1210-N) and an expansion valve 1220 (1220-1 to 1220-N). According to the present disclosure, the outdoor unit 1100a may further include an accumulator 1191, and may include a distributor distributing a refrigerant to each of the compressors 1110-1 and 1110-2 when the plurality of compressors 1110-1 and 1110-2 (1110) are provided.

The outdoor unit 1100a may further include a bypass module for allowing the refrigerant discharged from the first heat exchanger 1111 to detour in a direction from at least one compressor 1110 (1110-1 and 1110-2).

The refrigerant compressed by at least one compressor 1110 (1110-1 and 1110-2) and discharged is introduced into the first heat exchanger 1111, and the refrigerant discharged from the first heat exchanger 1111 is moved in a direction (direction A) of at least one compressor 1110 (1110-1 and 1110-2) by the bypass module in a first stage, and the refrigerant is re-compressed by at least one compressor 1110 (1110-1 and 1110-2) and discharged. The discharged refrigerant is introduced into the first heat exchanger 1111, and the refrigerant discharged from the first heat exchanger 1111 is moved in a direction of the outdoor 1200 (1200-1 to 1200-N) by the bypass module in a second stage. Therefore, the refrigerant may be compressed by at least one compressor 1110 (1110-1 and 1110-2) in two stages.

In the case of the two-stage-compression, the p-h graph is provided as shown in FIG. 7. In other words, when the air conditioner 1000 performs a cooling operation based on the two-stage-compression, a pressure is increased from a first pressure p1 to a third pressure p3 in the heat exchanger 1111, and enthalpy is increased from first enthalpy h1 to fourth enthalpy h4 in the first heat exchanger 1111 (G-H section). The heat exchanger 1111 increases the pressure of the refrigerant from the third pressure p3 to a second pressure p2 (H-I section), and the first heat exchanger 1111 increases the enthalpy from the fourth enthalpy h4 to third enthalpy h3 (I-J section) again. The pressure is decreased to the first pressure p1 in the expansion valve 1220 (1220-1 to 1220-N), and the enthalpy is decreased to the second enthalpy h2 (J-K section). The enthalpy is decreased from the second enthalpy h2 to the first enthalpy h1 in the second heat exchanger 1210 (1210-1 to 1210-N) (K-F section). Therefore, as shown in FIG. 7, in the case of the two-stage-compression, a relation between pressure and enthalpy in the cooling cycle has a shape in which two rectangles are disposed adjacent to each other. In the case of the air conditioner 1000 performing a heating operation, changes in pressure and enthalpy are generated in the opposite direction from that of the above-description.

As described above, a saturation curve SC meets a straight line (line segment BC) at one point, that is, a point L, and an overcooling temperature Tl may be measured using a size of a section z12 between points I and L, that is, an enthalpy difference.

Figure 8:
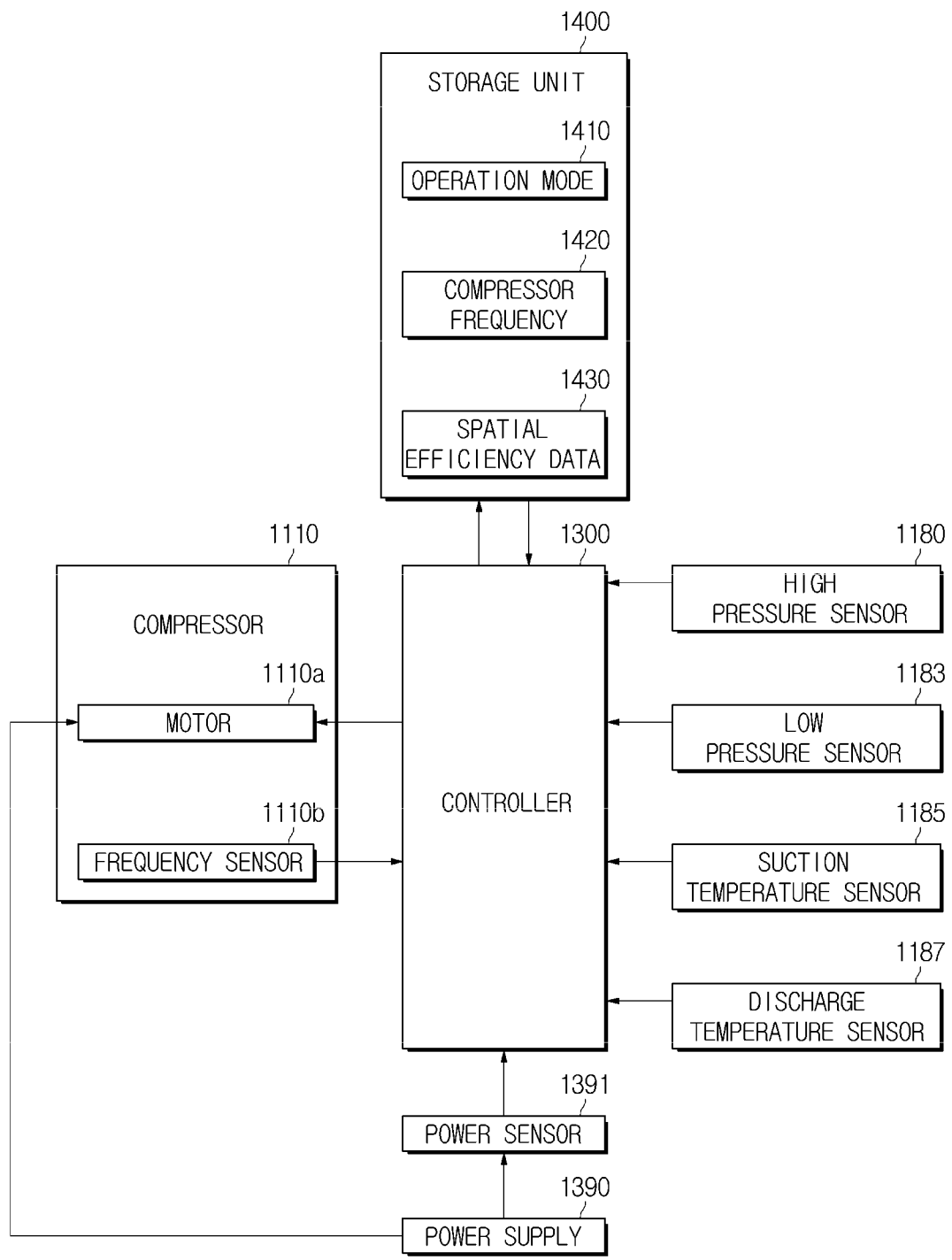
FIG. 8 is a control block diagram of one embodiment of the air conditioner.

FIG. 8 is a control block diagram of one embodiment of the air conditioner.

Referring to FIG. 8, according to one embodiment, the air conditioner 1000 may include the controller 1300 for controlling overall operation of the air conditioner 1000, the storage unit 1400 for storing various pieces of information required for at least one of operations of the air conditioner 1000 and the controller 1300, a power supply 1390 supplying power to a motor 1110a of the compressor 1110 (1110-1 and 1110-2), and at least one sensor 1110b, 1180, 1183, 1185, 1187, and 1391 transmitting data corresponding to a measurement result to the controller 1300 in an electric signal form.

The controller 1300 may be operated using a device performing various calculation and control operations, for example, may be formed using a central processing unit (CPU), a MiCOM, a micro controller (MCU), and the like. The controller 1300 may be formed using one or a plurality of semiconductor chips or a device including the same.

According to one embodiment, the controller 1300 may be formed using a general processing device, and in this case, the controller 1300 may perform calculation and control operations by operating a program stored in the storage unit 1400. The program stored in the storage unit 1400 may be stored by a designer, or may be provided from an external server device configured to be connectable using separate communication networks. For example, the program may be provided through electronic software networks. Further, the controller 1300 may be formed using a processing device programed to operate a predetermined operation by a designer.

The controller 1300 may calculate an air conditioning capacity and efficiency corresponding to the air conditioning capacity based on various pieces of information transmitted from at least one sensor 1110b, 1180, 1183, 1185, 1187, and 1391, which will be described below.

The storage unit 1400 may be formed using a magnetic disk storage medium, a magnetic drum storage medium, or a semiconductor storage medium. In this case, the semiconductor storage medium may include a volatile memory, such as a static random access memory (S-RAM), a dynamic random access memory (D-RAM), or the like, or may include a non-volatile memory such as a read only memory (ROM), an erasable programmable read only memory (EPROM), an electrically erasable programmable read only memory (EEPROM), a flash memory, or the like.

According to one embodiment, the storage unit 1400 may be provided to store at least one piece of operation mode information 1410, compressor frequency information 1420, and spatial efficiency data 1430.

The operation mode information 1410 may include information on a current operation state of the air conditioner 1000. For example the operation mode information 1410 may include any one piece of information on whether the air conditioner 1000 is currently performing a cooling operation and information on whether the air conditioner 1000 is currently performing a heating operation. The controller 1300 may realize that the air conditioner 1000 performs the cooling operation or the heating operation based on the operation mode information 1410.

The compressor frequency information 1420 may include information on a frequency in which the motor 1110*a* of the compressor 1110 is operated. The controller 1300 may realize a frequency of the compressor 1110 by opening the compressor frequency information 1420 as necessary. When the compressor 1110 includes a frequency sensor 120, the compressor frequency information 1420 may not be included in the storage unit 1400.

The spatial efficiency data 1430 may be formed by combining calculation results of at least one of air conditioning capacity and efficiency. At least one of the air conditioning capacity and air efficiency may be obtained by the controller 1300. The controller 1300 may obtain, at a plurality of times, at least one of the air conditioning capacity and efficiency corresponding to the plurality of times, and the spatial efficiency data 1430 may be formed by combining calculation results of at least one of air conditioning capacity and efficiency at the plurality of times according to the obtained results of the controller 1300. The spatial efficiency data 1430 may be obtained in a periodical manner, or may be obtained at arbitrary times defined by the controller 1300. In this case, the periodical manner may include a relatively short period such as one or two seconds or the like, and may include a relatively long period such as one day, month, or year.

The power supply 1390 may supply power required for an operation to the motor 1110*a*, and may also supply power required for various components in the air conditioner 1000, such as the controller 1300, in addition to the motor 1110*a*. The power supplied from the power supply 1390 or the amount thereof may be detected by a power sensor 1391.

The frequency sensor 1110*b* may be provided to measure a rotation frequency of the motor 1110*a* of the compressor 1110, that is, a compressor frequency. The frequency sensor 1110*b* may be formed using various sensors used to detect a rotation frequency of the motor 1110*a* such as an encoder and the like. When the storage unit 1400 stores the compressor frequency information 1420, the frequency sensor 1110*b* may be omitted.

The high pressure sensor 1180 may be provided to measure a first pressure p2 of a refrigerant discharged from the compressor 1110, which may be referred to as a high pressure, and to transmit the measurement result to the controller 1300. Referring to FIGS. 4 and 6, the high pressure sensor 1180 may be installed adjacent to an outlet of the compressor 1110, and for example, may be installed between the compressor 1110 and the first heat exchanger 1111. According to one embodiment, the high pressure sensor 1180 may be installed between the compressor 1110 and the four-way valve 1113. The high pressure sensor 1180 may be formed using a piezo-resistive pressure sensor, a capacitive pressure sensor, and/or a piezo-electric effect pressure sensor, and may be formed using various types of pressure sensors considered by a designer.

The low pressure sensor 1183 may measure a second pressure p1 of a refrigerant supplied from the compressor 1110 p1, which is referred to as a low pressure, and may transmit the measurement result to the controller 1300 through a wire, a circuit, or wireless communication networks. Referring to FIGS. 4 and 6, the low pressure sensor 1183 may be installed adjacent to a refrigerant inlet of the compressor 1110, and for example, may be installed between the compressor 1110 and the accumulator 1191. In addition, the low pressure sensor 1183 may be installed between the compressor 1110 and the second heat exchanger 1210 (1210-1 to 1210-N). The low pressure sensor 1183 may be formed using a piezo-resistive pressure sensor, a capacitive pressure sensor, and/or a piezo-electric effect pressure sensor like the high pressure sensor 1180, and may also be formed using various types of pressure sensors considered by a designer.

The suction temperature sensor 1185 may be provided to measure a first temperature of the refrigerant supplied to the compressor 1110. The suction temperature sensor 1185 may be installed adjacent to a refrigerant inlet of the compressor 1110, and for example, as shown in FIGS. 4 and 6, may be installed between the four-way valve 1130 and the accumulator 1191. In addition, the suction temperature sensor 1185 may be installed at various positions considered by a designer. The suction temperature sensor 1185 may be formed using various sensors measuring a temperature of refrigerant such as a bimetal thermometer, a thermistor thermometer or an infrared thermometer.

The discharge temperature sensor 1187 may be provided to measure a second temperature of a refrigerant discharged from the compressor 1110. The discharge temperature sensor 1187 may be installed adjacent to a refrigerant outlet of the compressor 1110, and for example, may be installed between the first heat exchanger 1111 and the indoor units 1200-1 to 1200-N (1200), for example, the expansion valves 1220-1 to 1220-N (1220), as shown in FIG. 4, or between the bypass module and the indoor units 1200-1 to 1200-N (1200) as shown in FIG. 6, for example, the expansion valves 1220-1 to 1220-N (1220). In addition, the discharge temperature sensor 1187 may be installed at various positions considered by a designer. The discharge temperature sensor 1187 may be formed using various sensors measuring a temperature of refrigerant such as a bimetal thermometer, a thermistor thermometer or an infrared thermometer like the suction temperature sensor 1185.

The power sensor 1391 is provided to measure a voltage, a current, power supplied from the power supply 1390 or the amount of power, and may be formed using a voltage meter, a current meter, a power meter, and/or a watt-hour meter. The measurement result of the power sensor 1391 is transmitted to the controller 1300, and the controller 1300 may calculate efficiency based on the transmitted measurement result as necessary. In an embodiment, the power sensor 1391 may be omitted.

Hereinafter, a specific operation of the controller 1300 will be described.

Figure 9:
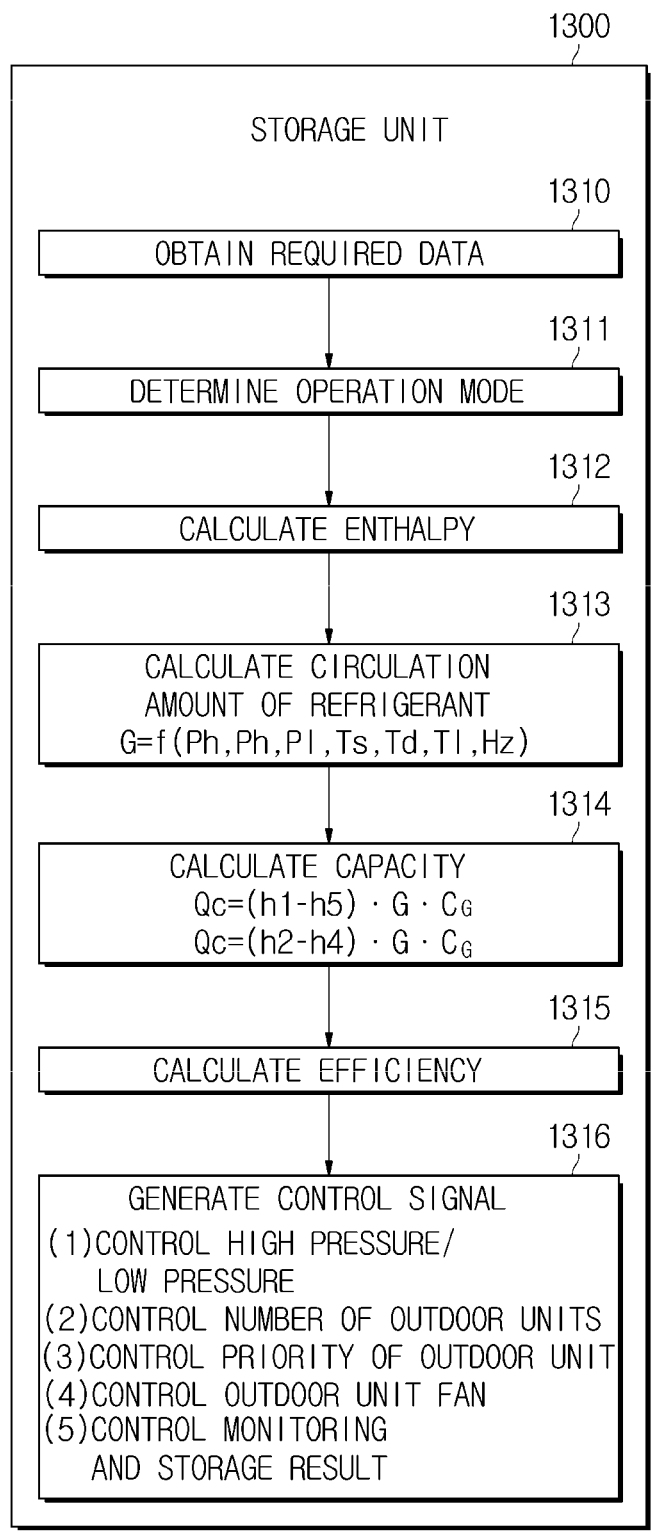
FIG. 9 is a view for describing one embodiment of the controller.

FIG. 9 is a view for describing one embodiment of the controller.

Referring to FIG. 9, the controller 1300 may first periodically or aperiodically receive data for calculation and control signal generation from at least one sensor 1110*b*, 1180, 1183, 1185, 1187, and 1391 (1301). In this case, the controller 1300 may receive required data from only a specific sensor, such as a high pressure sensor 1180, a low pressure sensor 1183, a suction temperature sensor 1185, and a discharge temperature sensor 1187, as necessary. Further, the controller 1300 may obtain the required data by opening the storage unit 1400. For example, the controller 1300 may obtain required data by opening the storage unit 1400. For example, the controller 1300 may receive operation mode information 1410 or compressor frequency information 1420 from the storage unit 1400.

According to one embodiment, when the compressor frequency is 0 or less than a predetermined reference value, the controller 1300 may be set not to perform an operation after receiving the data 1301 to prevent unnecessary calculation and control.

Further, according to one embodiment, even when the first pressure transmitted from the high pressure sensor 1180 is not greater than the pre-defined first reference pressure, and/or the second pressure transmitted from the low pressure sensor 1183 is not greater than the pre-defined second reference pressure, the controller 1300 may be set not to perform an operation after receiving data (1301) so as to prevent unnecessary calculation and control. In this case, any one of the first reference pressure and the second reference pressure may be defined by as designer. According to one embodiment, the first and second reference pressures may be defined based on a pressure in which the air conditioner 1000 is not actually operated.

The controller 1300 may determine whether the air conditioner 1000 performs a heating operation or a cooling operation by opening the operation mode information 1410 or by a separate method, for example, using the discharged air temperature sensor installed in the indoor units 1200-1 to 1200-N (1200) and the like (1302).

When it is determined whether the air conditioner 1000 performs a heating operation or a cooling operation, the controller 1300 may obtain predetermined enthalpy according to whether the heating operation or the cooling operation is performed (1303).

For example, when the air conditioner 1000 performs the heating operation, the controller 1300 may obtain the enthalpy at the inlet of the first heat exchanger 1111. Particularly, referring to FIG. 4, the controller 1300 may obtain enthalpy at a high pressure p2, that is, from first enthalpy h1 to third enthalpy h3, or may obtain enthalpy at a high pressure p2, that is, the first enthalpy h1 and fourth enthalpy h4 as shown in FIG. 6. In this case, the controller 1300 may use a formula of pre-defined enthalpy to obtain the enthalpy h1, h3, and h4, or may refer to a table obtained based on a previous experience or test.

For another example, when the cooling operation is performed, the controller 1300 may obtain enthalpy at an inlet of the second heat exchanger 1210 (1210-1 to 1210-N). For example, as shown in FIG. 4, in the case of the cooling operation, the controller 1300 may obtain enthalpy at a lower pressure p2, that is, from the first enthalpy h1 to the second enthalpy h2, or may obtain enthalpy at a lower pressure p2, that is, the first enthalpy h1 and the second enthalpy h2, as shown in FIG. 6. As described above, the enthalpy h1 and h2 may be obtained based on the pre-defined formula, or may be obtained with reference to a separate table.

The circulation amount of refrigerant may be calculated at a time when or after the enthalpy is obtained (1303) (1304). The calculation (1304) of the circulation amount of refrigerant may be performed before the enthalpy is obtained (1303).

According to one embodiment, the controller 1300 may calculate the circulation amount of refrigerant by combining a first pressure transmitted from the high pressure sensor 1180, a second pressure transmitted from the low pressure sensor 1183, a first temperature transmitted from the suction temperature sensor 1185, a second temperature transmitted from the discharge temperature sensor 1187, a separately calculated overcooling temperature, and a compressor rotation frequency transmitted from the frequency sensor 120 or obtained from the storage unit 1400.

According to one embodiment, the controller 1300 may be designed to calculate the circulation amount of refrigerant based on the following Formula 1.

$$G = f(Ph, Pl, Ts, Td, Tl, Mf) \qquad \text{Formula 1}$$

In this case, G represents a circulation amount of a refrigerant, Ph represents a first pressure, Pl represents a second pressure, Ts represents a first temperature, Td represents a second temperature, Tl represents an overcooling temperature, and Mf represents a compressor frequency.

In other words, a circulation amount G of a refrigerant may be provided as a predetermined function for a first pressure Ph, a second pressure Pl, a first temperature Ts, a second temperature Td, an overcooling temperature Tl, and a compressor frequency Mf.

In this case, Formula 1 may be provided, for example, as a form of the following Formula 2.

$$G = c_1 \cdot Ph^2 + c_2 \cdot Pl^2 + c_3 \cdot Ts^2 + c_4 \cdot Td^2 + c_5 \cdot Tl^2 + c_6 \cdot Mf^2 \qquad \text{Formula 2}$$

As described above, in Formula 2, G represents a circulation amount of a refrigerant, Ph represents a first pressure, Pl represents a second pressure, Ts represents a first temperature, Td represents a second temperature, Tl represents an overcooling temperature, and Mf represents a compressor frequency. $c_1$ to $c_6$ represent constants to be applied to a first pressure Ph, a second pressure Pl, a first temperature Ts, a second temperature Td, a overcooling temperature Tl, and a compressor frequency Mf, and may be defined through mathematic calculation or may be experimentally or empirically defined.

As described in Formula 2, a circulation amount G of a refrigerant may be determined by adding the sum of square of the first pressure Ph, square of the second pressure Pl, square of the first temperature Ts, square of the second temperature Td, square of overcooling temperature Tl, and square of compressor frequency Mf. In other words, the circulation amount G of the refrigerant may be provided as a form of a quadratic function of the first pressure Ph, the second pressure Pl, the first temperature Ts, the second temperature Td, the overcooling temperature Tl, and the compressor frequency Mf.

Therefore, the circulation amount G of the refrigerant may increase more quickly than an increased speed of the first pressure Ph, the second pressure Pl, the first temperature Ts, the second temperature Td, the overcooling temperature Tl, or the compressor frequency Mf.

The above-described Formula 1 and Formula 2 may be obtained through a separate mathematical calculation, or may be empirically obtained. When Formula 1 and 2 are empirically obtained, Formula 1 and Formula 2 may be calculated by performing a regression analysis using the circulation amount G of the refrigerant as a dependent variable and using the first pressure Ph, the second pressure Pl, the first temperature Ts, the second temperature Td, the overcooling temperature Tl, and the compressor frequency Mf as an independent variable.

When the circulation amount G of the refrigerant is calculated, the controller 1300 may obtain an air conditioning performance of the air conditioner 1000 using the circulation amount G of the refrigerant and the enthalpy (1305).

According to one embodiment, when the air conditioner 1000 performs a cooling operation, the controller 1300 may obtain an air conditioning capacity using the following Formula 3.

$$Q_c = \Delta h_{p2} \cdot G \cdot C_G \quad \text{Formula 3}$$

In this case, $Q_c$ represents an air conditioning capacity in the case of the cooling operation, that is, a cooling capacity, $\Delta h_{p2}$ represents a difference between enthalpy at an inlet and an outlet of the second heat exchanger 1210 (1210-1 to 1210-N) and represents a difference between the second enthalpy $h_2$ and the first enthalpy $h_1$. G represents a circulation amount of a refrigerant, and $C_G$ represents a predetermined constant. In this case, $C_G$ may be arbitrarily defined according to selection of a designer, for example, may be defined as 1000/3600.

Referring to Formula 3, a cooling capacity $Q_c$ may be proportional to a product of a difference $\Delta h_{p2}$ between enthalpy at an input and an output of the second heat exchanger 1210 (1210-1 to 1210-N) and the circulation amount G of the refrigerant, and thus the cooling capacity $Q_c$ is increased to be proportional to an increase in difference $\Delta h_{p2}$ between enthalpy at an input and an output of the second heat exchanger 1210 (1210-1 to 1210-N) when the difference $\Delta h_{p2}$ between enthalpy at an input and an output of the second heat exchanger 1210 (1210-1 to 1210-N) is increased, and/or may be increased to be proportional to an increase in circulation amount G of the refrigerant when the circulation amount G of the refrigerant is increased.

Further, according to one embodiment, when the air conditioner 1000 performs a heating operation, the controller 1300 may calculate an air conditioning capacity using the following Formula 4 and may obtain the air conditioning capacity.

$$Q_h = \Delta h_{p1} \cdot G \cdot C_G \quad \text{Formula 4}$$

In this case, $Q_h$ represents an air conditioning capacity when the air conditioner 1000 performs an air conditioning capacity, that is, a heating operation, and $\Delta h_{p1}$ represents a difference between enthalpy at an input and output of the first heat exchanger 1111. That is, $\Delta h_{p1}$ may represent a difference between the first enthalpy $h_1$ and the third enthalpy $h_3$ in FIG. 4 or a difference between the first enthalpy $h_1$ and the fourth enthalpy $h_4$ in FIG. 6. G represents a circulation amount of a refrigerant obtained as described above, and $C_G$ is a pre-defined constant. In this case, $C_G$ may be arbitrarily defined by selection of a designer, and for example, may be provided as 1000/3600.

Referring to Formula 4, a heating capacity $Q_h$ may be provided to be proportional to a product of the difference $\Delta h_{p1}$ between enthalpy at an inlet and an outlet of the first heat exchanger and the circulation amount G of the refrigerant.

When the air conditioning capacity by an operation of the air conditioner 1000, that is, any one of the cooling capacity $Q_c$ and the heating capacity $Q_h$, is obtained, the controller 1300 may obtain an operation of the air conditioner 1000 based on the obtained air conditioning capacity (1315).

Operating efficiency of the air conditioner may be arbitrarily defined according to the designer. For example, the operating efficiency of the air conditioner 1000 may be defined as air conditioning capacity with respect to power consumption or as power consumption with respect to air conditioning capacity. Further, the operating efficiency of the air conditioner 1000 may be defined by a test of the designer using the air conditioning capacity as an independent variable.

When the obtaining of air conditioning capacity and efficiency (1314 and 1315) is finished, the controller 1300 may control an operation of the air conditioner 1000 by generating a control signal based on at least one of the air conditioning capacity and efficiency (1316).

For example, the controller 1300 may control the amount of at least one of the first pressure, that is, a high pressure, and a second pressure, that is, a low pressure, by controlling the compressor 1110 based on at least one of the air conditioning capacity and efficiency.

For another example, the controller 1300 may generate the spatial efficiency data 1430 using at least one of the air conditioning capacity and efficiency, may store the generated spatial efficiency data 1430 in the storage unit 1400, may continuously monitor whether performance of the outdoor unit 1100 is degraded based on the stored spatial efficiency data 1430, and/or may set a maintenance plan for the air conditioner 1000, for example, the outdoor unit 1100, based on the monitoring and storing results.

For another example, the controller 1300 may control a fan 1114 of the outdoor unit 1100 to start an operation of the fan 1114 or rotate the fan 1114 at different angle speeds.

For still another example, when a plurality of outdoor units 1100 are provided, the controller 1300 may determine which outdoor unit 1100 to be operated or the quantity of outdoor units to be operated, may control an operation of the outdoor unit 1100 according to the determined result, and may control the outdoor unit 1100 based on a determined priority of the outdoor unit 1100.

Only one operation of the controller 1300 may be performed as necessary, at least two operations thereof may be partially performed, or all operations may be performed. The operation of the controller 1300 may be selected by a user or a designer.

Hereinafter, each control of the controller 1300 will be more specifically described.

FIG. 10 is a table for describing an example of a relation between air conditioning efficiency and capacity.

Referring to FIG. 10, the efficiency of the air conditioner 1000, for example, the outdoor unit 1100, will be changed according to a change in pressure or cooling capacity.

For example, when the air conditioner 1000 performs the cooling operation, a second pressure, that is, a low pressure, is controlled as described above, the air conditioner 1000 may be controlled. As a second pressure is increased, the cooling capacity is decreased, and the efficiency may be relatively increased. On the contrary, when the second pressure is decreased, the cooling capacity is increased but the efficiency is relatively decreased.

Further, when the air conditioner 1000 performs the heating operation, as described above, the first pressure, that is, a high pressure, may be controlled. When the first pressure is increased, the cooling capacity is increased, but the efficiency is relatively decreased. When the first pressure is decreased, the cooling capacity is decreased, but the efficiency is relatively increased.

By using the above-described characteristics, the controller 1300 increases or decreases the first pressure or increases or decreases the second pressure, and thus appropriately controls air conditioning capacity or efficiency. For example, when the increase in the air conditioning capacity is relatively put before the increase in efficiency and the air conditioner 1000 performs the cooling operation, the controller 1300 may control the compressor 1110 so that the second pressure is relatively decreased as shown in FIG. 10 so as to increase cooling capacity. For another example, when the increase in the efficiency is relatively put before the increase in air conditioning capacity and the air conditioner 1000 performs a heating operation, the controller 1300 controls the compressor 1110 to relatively decrease the first pressure so as to increase efficiency. In addition, the controller 1300 may control at least one of the first pressure and the second pressure with at least one method considered by a designer according to an operation state of the air conditioner 1000 or required air conditioning capacity and/or efficiency.

According to one embodiment, the controller 1300 may control any one of the first pressure and the second pressure further using indoor moisture obtained from a separate moisture measuring unit, for example, a hygrometer. For example, when the cooling operation is performed and the moisture is high, the air conditioning efficiency may be maintained even though the second pressure is decreased. Further, comfort of a person who is positioned in the indoor space may vary depending on the moisture, and thus the cooling capacity may be further increased relatively. Therefore, the controller 1300 may control at least one of the first pressure and the second pressure differently from that of the above description based on the indoor moisture.

Figure 11:
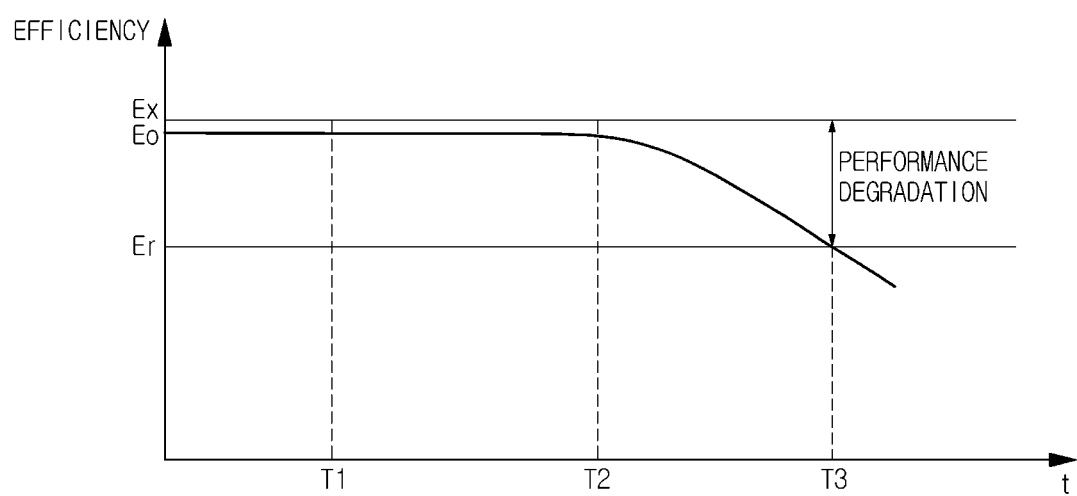
FIG. 11 is a view for describing performance degraded as time elapses.

FIG. 11 is a view for describing performance degraded as time elapses.

For example, the spatial efficiency data 1430 formed based on the efficiency of the air conditioner 1000 or the outdoor unit 1100 may be provided as shown in FIG. 11. Particularly, referring to FIG. 11, efficiency Eo may be constantly or inconsistently maintained at a level close to a required level Ex in an initial time T1, and may be decreased due to abrasion, damage, degradation or the like of a component, such as the compressor 1110, after a particular time T2. In other words, the performance of the air conditioner 1000 is degraded.

According to one embodiment, the controller 1300 may regularly or irregularly open the spatial efficiency data 1430 to monitor reduction of the efficiency, and may determine a time T3 for replacement of components based on the monitoring result. The controller 1300 may determine a time when the efficiency Eo meets a predetermined reference efficiency Er as a time T3 for replacement of component. In this case, the controller 1300 may notify of replacement of components through a separate user interface or an external server device.

Further, the controller 1300 calculates a time expected of the efficiency Eo to reach the reference efficiency Er based on a change record of a previous efficiency Eo, and generates a maintenance plan by determining the time T3 for replacement of components based on the calculated time. In this case, the controller 1300 may notify of the time T3 for replacement of components through a separate user interface or an external server device or store the time T3 in the storage unit 1400.

According to another embodiment, when the efficiency Eo of the air conditioner 1000 or the outdoor unit 1100 is less than a predetermined reference efficiency Er, the controller 1300 may control a rotation speed of the outdoor unit fan 1114. In this case, the controller 1300 may temporarily increase air conditioning capacity or efficiency of the outdoor unit 1100 or the air conditioner 1000 by increasing a rotation speed of the outdoor unit fan 1114, that is, by increasing the rotation frequency of the outdoor unit fan 1114. Therefore, the capacity of the air conditioner 1000 may be temporarily increased, and thus user inconvenience caused by degradation of the capacity of the air conditioner 1000 is reduced. The rotation speed of the outdoor unit fan 1114 may be temporarily controlled before the outdoor unit 1110 is repaired.

Further, when the efficiency Eo of the air conditioner 1000 or the outdoor unit 1100 is less than a predefined reference efficiency Er, the controller 1300 may control a rotation speed of the motor of the compressor 1110, that is, a frequency of the compressor, instead of the outdoor unit fan 1114. In this case, the controller 1300 increases the frequency of the compressor by increasing flow speed of the refrigerant discharged from the compressor 1110, thereby temporarily increasing the air conditioning capacity or efficiency of the air conditioner 1000 or the outdoor unit 1100

Figure 12:
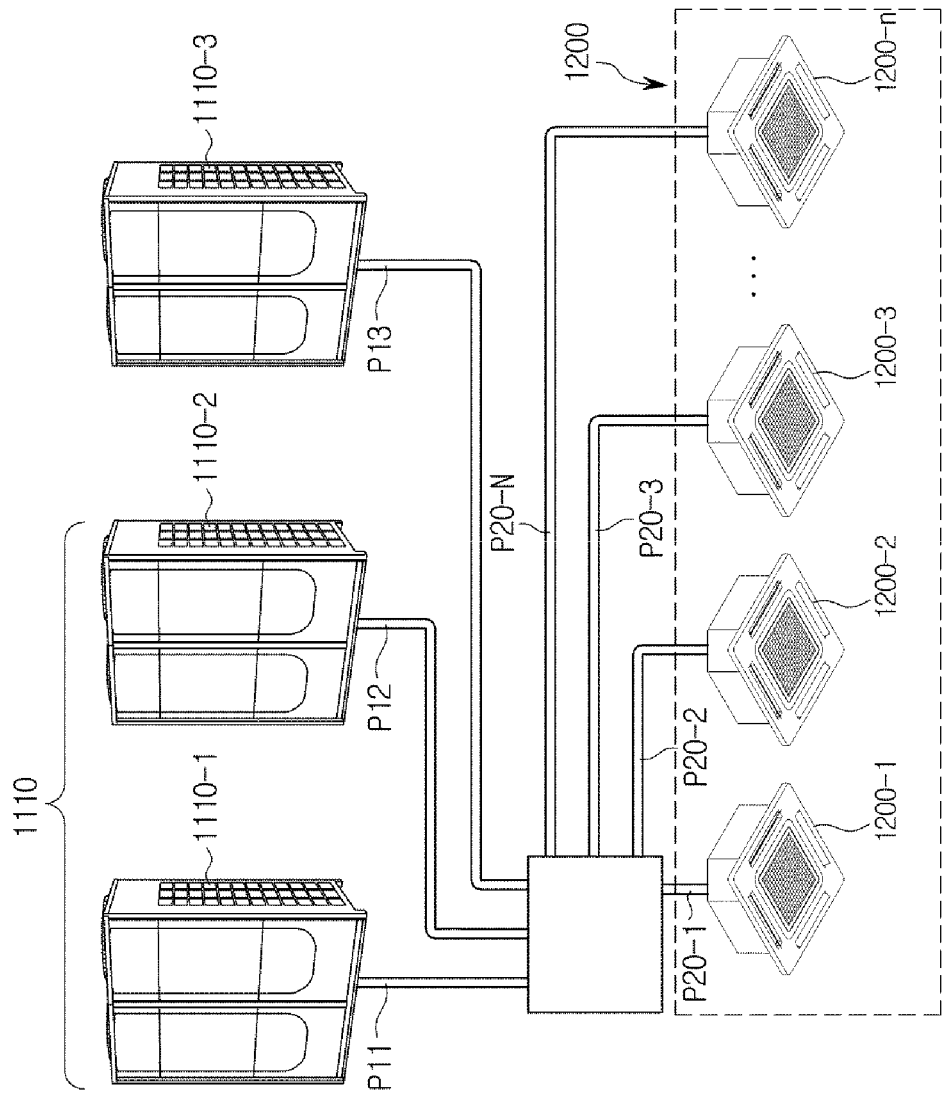
FIG. 12 is an entire view of one embodiment of the air conditioner with a plurality of outdoor units.
Figure 13:
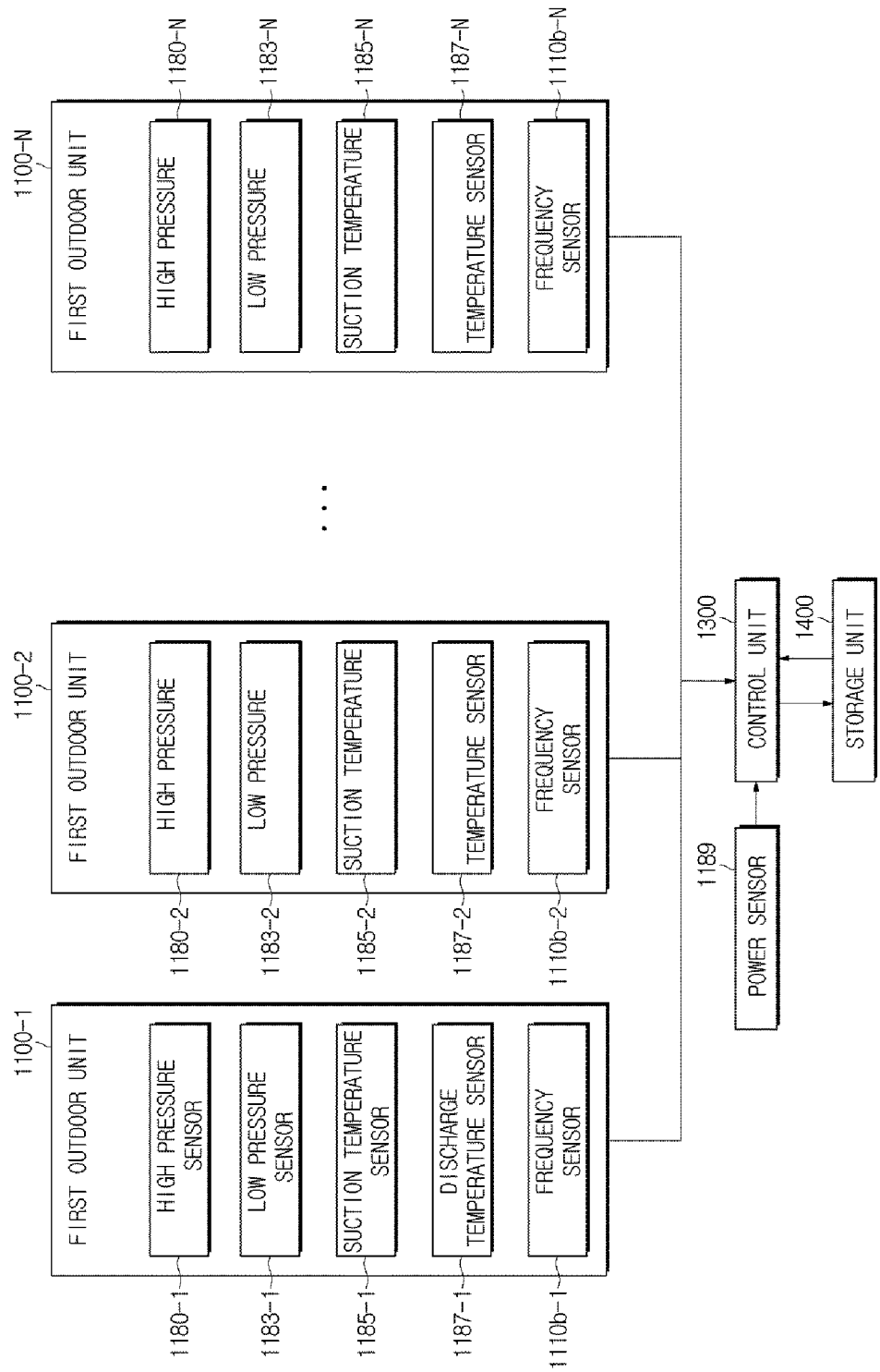
FIG. 13 is a control block diagram of one embodiment of the air conditioner with a plurality of outdoor units.

FIG. 12 is an entire view of one embodiment of the air conditioner with a plurality of outdoor units, and FIG. 13 is a control block diagram of one embodiment of the air conditioner with a plurality of outdoor units.

According to one embodiment, as shown in FIG. 12, the air conditioner 1000-2 may include a plurality of outdoor units 1100-1 to 1100-N (1100), and at least one outdoor unit 1200 (1200-1 to 1200-N) connectable to at least one of the outdoor units 1100-1 to 1100-N (1100).

Each of the plurality of outdoor units 1100-1 to 1100-N (1100) may include the compressor 1110 and the first heat exchanger 1111 as described above, and may further include the four-way valve 1113 or the accumulator 1191 as necessary. Further, the plurality of outdoor units include expansion valves 1220-1 to 1220-N (1220).

Referring to FIG. 13, each of the plurality of outdoor units 1110-1 to 1110-N (1110) may further include high pressure sensors 1180-1 to 1180-N, low pressure sensors 1183-1 to 1180-N, suction temperature sensors 1185-1 to 1185-N, discharge temperature sensors 1187-1 to 1187-N, and may further include frequency sensors 1110b-1 to 1110b-N as necessary.

Each of the high pressure sensors 1180-1 to 1180-N, the low pressure sensors 1183-1 to 1180-N, the suction temperature sensors 1185-1 to 1185-N, the discharge temperature sensors 1187-1 to 1187-N, the frequency sensors 1110b-1 to 1110b-N may separately transmit the monitoring result to the controller 1300 through a wire, a circuit, or wireless communication networks.

Further, the air conditioner 1000-2 may further include a distributor 1500 connected to the plurality of outdoor units 1110-1 to 1110-N (1110) and at least one indoor unit 1200 (1200-1 to 1200-N). The distributor 1500 may connect at least one of the plurality of outdoor units 1110-1 to 1110-N (1110) with at least one of the plurality of indoor units 1200-1 to 1200-N (1200) according to a control of the controller 1300. The distributor 1500 may be formed using at least one valve and at least one pipe.

Further, as shown in FIG. 13, the air conditioner 1000-2 may include a controller 1300 and a storage unit 1400, and may further include a power sensor 1189 as necessary.

Figure 14:
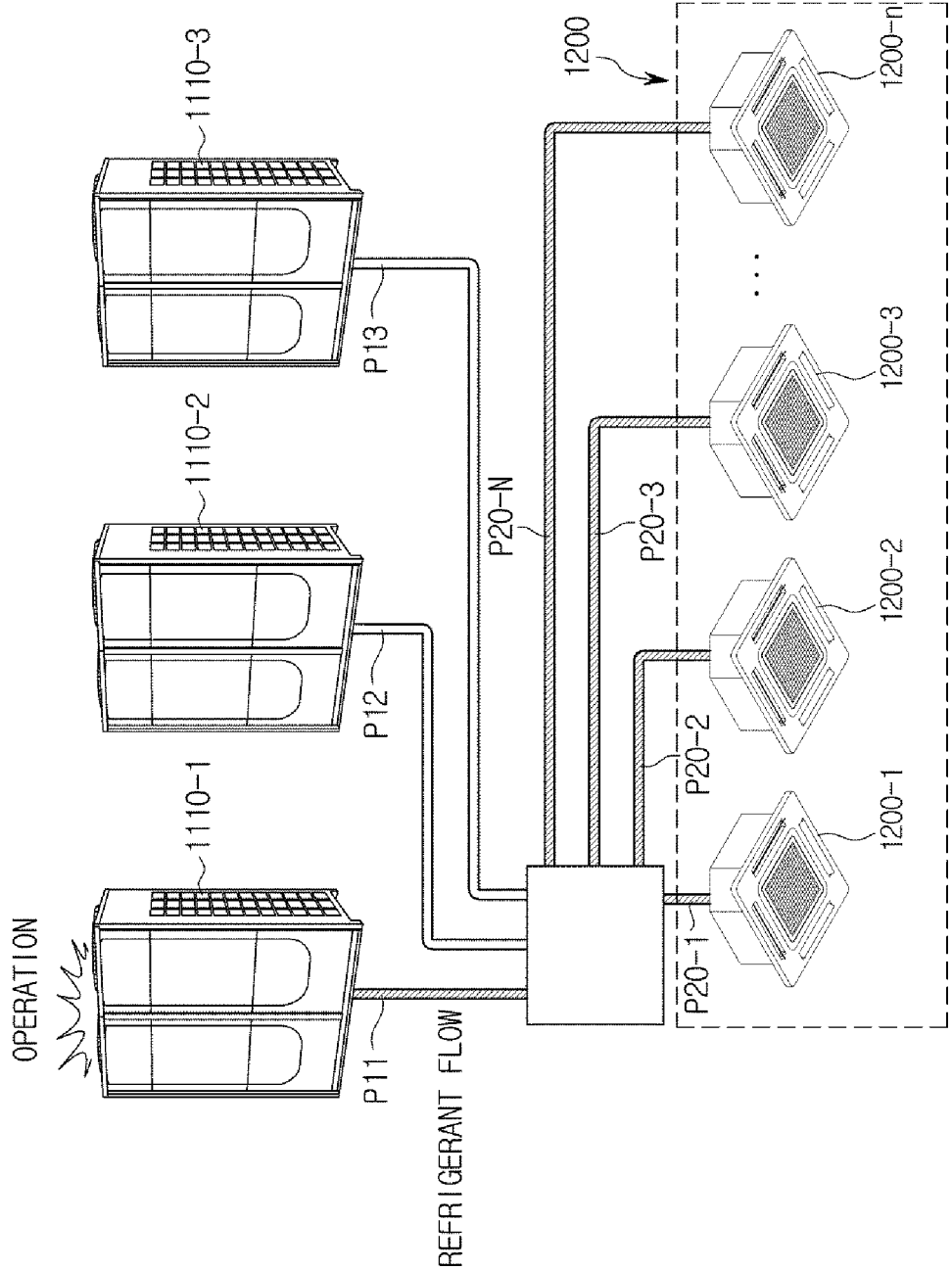
FIG. 14 is a first view for describing an example of a process of calculating an air conditioning capacity.
Figure 15:
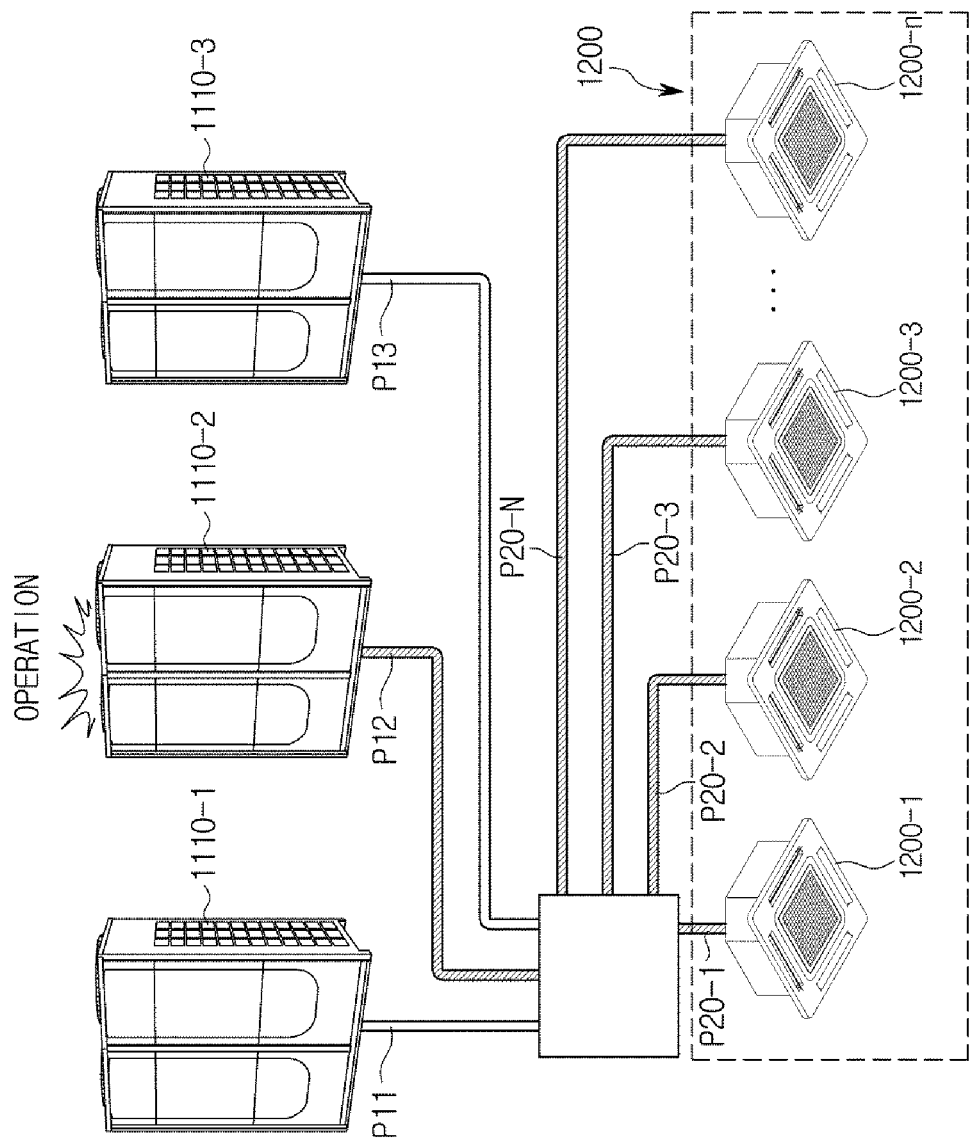
FIG. 15 is a second view for describing an example of a process of calculating an air conditioning capacity.

FIG. 14 is a first view for describing an example of a process of calculating an air conditioning capacity, and FIG. 15 is a second view for describing an example of a process of calculating an air conditioning capacity.

As shown in FIG. 9, the controller 1300 may obtain data that each of the outdoor units 1110-1 to 1110-N (1110) separately needs, that is, information on first pressure, second pressure, first temperature and second temperature, may determine whether an operation state of each of the outdoor units 1110-1 to 1110-N (1110), that is, a cooling operation or a heating operation, and may calculate a circulation amount of refrigerant and an air conditioning capacity for each of the outdoor units 1110-1 to 1110-N (1110) and obtain the circulation amount of refrigerant and the air conditioning capacity. Therefore, the controller 1300 may obtain efficiency for each of the outdoor units 1110-1 to 1110-N (1110).

Particularly, for example, referring to FIG. 14, the controller 1300 connects the first outdoor unit 1100-1 with at least one outdoor unit 1200 (1200-1 to 1200-N) by controlling the distributor 1500, and obtains an air conditioning capacity and air conditioning efficiency for the first outdoor unit 1100-1 by operating the first outdoor unit 1100-1 and at least one the indoor unit 1200 (1200-1 to 1200-N).

As shown in FIG. 15, the controller 1300 connects the second outdoor unit 1100-2 with at least one indoor unit 1200 (1200-1 to 1200-N) by controlling the distributor 1500, and obtains the air conditioning capacity and the air conditioning efficiency by operating the second outdoor unit 1100-2 with the at least one indoor unit 1200 (1200-1 to 1200-N).

The controller 1300 may obtain the air conditioning capacity and the air conditioning efficiency corresponding to each of the outdoor units 1110-1 to 1110-N (1110) by allowing all the outdoor units 1110-1 to 1110-N (1110) to repeat the operations Further, the controller 1300 selects at least two of the outdoor units 1110-1 to 1110-N (1110) and connects the selected outdoor units 1110-1 to 1110-N (1110) with at least one indoor unit 1200 (1200-1 to 1200-N) to obtain an air conditioning capacity and efficiency corresponding to the selected outdoor units 1110-1 to 1110-N (1110).

Therefore, when the air conditioning capacity and efficiency corresponding to each of the outdoor units 1110-1 to 1110-N (1110) are obtained, the controller 1300 may control an operation of each of the outdoor units 1110-1 to 1110-N (1110) based on the air conditioning capacity and efficiency.

For example, the controller 1300 may compare at least one of an air conditioning capacity and efficiency corresponding to each of the outdoor units 1110-1 to 1110-N (1110) and/or a combination thereof with each other, may control only the particular outdoor unit 1110 (one of the outdoor units 1110-1 to 1110-N) of all the outdoor units 1110-1 to 1110-N (1110) based on the comparison result, and/or may determine a priority for the outdoor units 1110-1 to 1110-N (1110) and control each of the outdoor units 1110-1 to 1110-N (1110) according to the determined priority.

Figure 16:
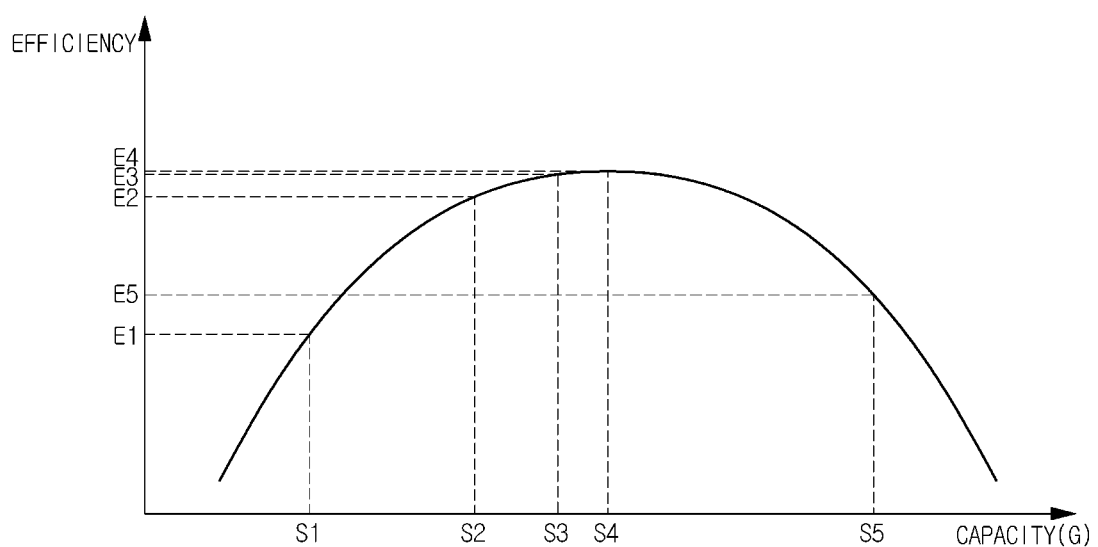
FIG. 16 is a graph for describing an efficiency change for the air conditioning capacity of the air conditioner.

FIG. 16 is a graph for describing an efficiency change for the air conditioning capacity of the air conditioner, and FIG. 17 is a view for describing a process of selecting an optimally efficient outdoor unit. In FIG. 16, a y-axis represents efficiency, and an x-axis represents an air conditioning capacity.

Referring to FIG. 16, when air conditioning capacity G is low, efficiency E is also increased as the air conditioning capacity G is increased. When the air conditioning capacity G is greater than a predetermined value S2, the efficiency E is decreased. In other words, the efficiency E may not be increased proportionally to the air conditioning capacity G. Further, when the air conditioning capacity G is low, an increase rate of efficiency E is relatively decreased according to an increase of the air conditioning capacity G. Therefore, the air conditioning capacity G is appropriately set to have the optimal efficiency E.

As shown in FIG. 17, when an air conditioning capacity G using the first outdoor unit 1110-1 is provided as s1, an air conditioning capacity G using the second outdoor unit 1110-2 is provided as s2, and an air conditioning capacity G using the third outdoor unit 1110-3 is provided as s3, the efficiency corresponding to each of the first outdoor unit 1110-1, the second outdoor unit 1110-2, and the outdoor unit 1110-3 may be provided as E1, E2, and E3 as shown in FIG. 16. Therefore, when the first outdoor unit 1110-1, the second outdoor unit 1110-2, and the outdoor unit 1110-3 are relatively compared with each other, the air conditioner 1000 is operated at the maximum efficiency E3 in the case of using only the third outdoor unit 1110-3.

When both the first outdoor unit 1110-1 and the second outdoor unit 1110-2 are connected with the indoor units 1200-1 to 1200-N (1200), for example, the air conditioning capacity G is provided as s2 as shown in FIG. 17. When both the first outdoor unit 1110-1 and the third outdoor unit 1110-3 are connected with the indoor units 1200-1 to 1200-N (1200), the air conditioning capacity G is determined as s4. When both the second outdoor unit 1110-2 and the third outdoor unit 1110-3 are connected with the indoor units 1200-1 to 1200-N (1200), the air conditioning capacity G is determined as s4.

Further, when all the first outdoor unit 1110-1, the second outdoor unit 1110-2 and the third outdoor unit 1110-3 are connected with the indoor units 1200-1 to 1200-N (1200), the air conditioning capacity G may be provided as s5, and therefore, the efficiency may be provided as E5.

Therefore, when a combination of two among the first outdoor unit 1110-1, the second outdoor unit 1110-2, and the third outdoor unit 1110-3 is compared with a combination of all of them, as shown in FIG. 16, the air conditioner 1000 is operated at the highest efficiency E4 when both the first outdoor unit 1110-1 and the third outdoor unit 1110-3 are connected to the indoor unit 1200 (1200-1 to 1200-N), or the second outdoor unit 1110-2 and the third outdoor unit 1110-3 are connected to the indoor unit 1200 (1200-1 to 1200-N).

The controller 1300 may obtain an air conditioning capacity G corresponding to each of the outdoor units 1110-1 to 1110-N (1110) and combinations thereof, and may control an operation of the outdoor unit 1110 (1110-1 to 1110-N) based on the air conditioning capacity G.

For example, the controller 1300 may obtain the highest efficient case of the outdoor units 1110-1 to 1110-N (1110) and combinations thereof and may control each of the outdoor units 1110-1 to 1110-N (1110) based on the obtained result. For example, as shown in FIG. 17, the controller 1300 may operate the first outdoor unit 1110-1 and the third outdoor unit 1110-3 or may operate the second outdoor unit 1110-2 and the third outdoor unit 1110-3 together.

For another example, the controller 1300 may store efficiency for each of the outdoor units 1110-1 to 1110-N (1110) and combinations thereof, determine a priority of the outdoor unit 1110 (1110-1 to 1110-N) and combinations thereof, and control the outdoor units 1110-1 to 1110-N (1110) according to the determined priority.

The compressor 1110, the frequency sensors 1110b-1 to 1110b-N, the first heat exchanger 1111, the four-way valve 1113, the accumulator 1191, the high pressure sensors 1180-1 to 1180-N, the low pressure sensors 1183-1 to 1180-N, the suction temperature sensors 1185-1 to 1185-N, the discharge temperature sensors 1187-1 to 1187-N, the power sensor 1189, the controller 1300, and the storage unit 1400 shown in FIGS. 12 and 13 are the same as described above, or may be partially modified. It has been described above in detail, and hereinafter, detailed descriptions thereof will be omitted.

Hereinafter, a method of controlling an air conditioner will be described with reference to FIG. 18.

Figure 18:
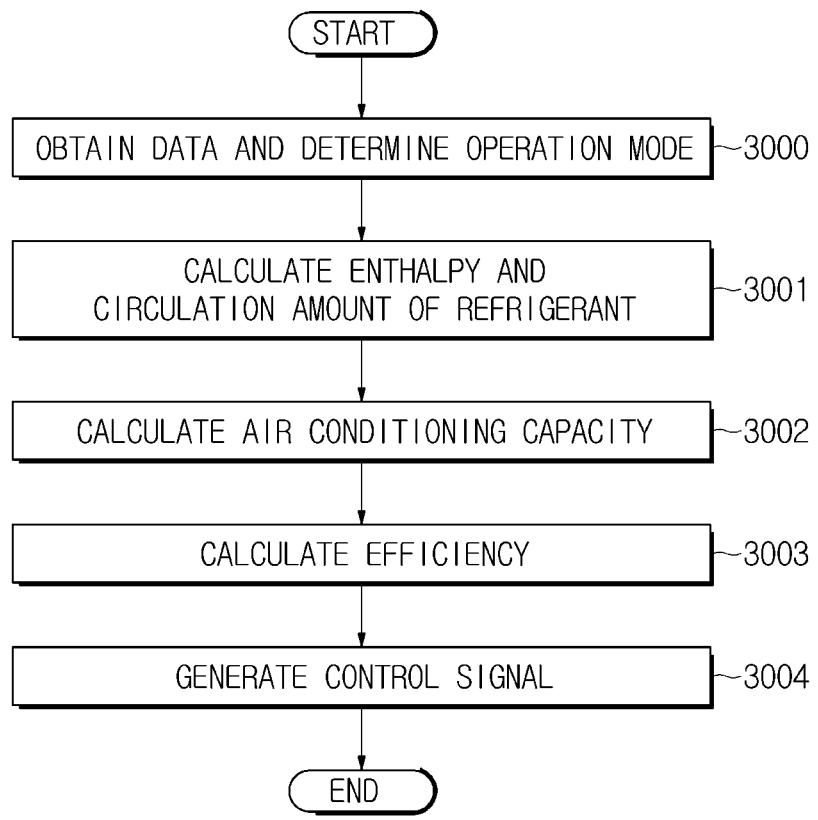
FIG. 18 is a flowchart for one embodiment of the method of controlling an air conditioner.

FIG. 18 is a flowchart for one embodiment of the method of controlling an air conditioner.

Referring to FIG. 18, data required to calculate air conditioning capacity and efficiency of the air conditioner is first obtained, and an operation mode of the air conditioner may be determined at a time when or after the data is obtained (3000). In this case, the required data may include a first pressure of a refrigerant discharged from a compressor, a second pressure of a refrigerant supplied from the compressor, a first temperature of a refrigerant supplied from the compressor, a second temperature of a refrigerant discharged from the compressor, an overcooling temperature, and a rotation frequency of the compressor. Further, the determination of the operation mode of the air conditioner may include whether an operation of the air conditioner is a cooling operation or a heating operation.

Enthalpy and a circulation amount of the refrigerant may be obtained (3001). The obtained enthalpy is determined to correspond to the operation mode. For example, when the air conditioner performs the cooling operation, the enthalpy at a low pressure, that is, enthalpy of the refrigerant supplied to a second heat exchange, and enthalpy of the refrigerant discharged from the second heat exchanger are obtained, and when the air conditioner performs the heating operation, enthalpy of the refrigerant supplied to a first heat exchange (an outdoor heat exchanger) and enthalpy of the refrigerant discharged from the first heat exchanger are obtained.

The circulation amount of the refrigerant may be obtained based on the first pressure, the second pressure, the first temperature, the second temperature, the overcooling temperature and the compressor frequency, and in this case, as shown in Formula 2, the circulation amount of refrigerant for each of the first pressure, the second pressure, the first temperature, the second temperature, the overcooling temperature and the compressor frequency may be provided in a form of a quadratic function.

When the enthalpy and the circulation amount of the refrigerant are obtained, the air conditioning capacity is obtained using the enthalpy and the circulation amount of refrigerant (3002). In this case, the air conditioning capacity may be calculated using different enthalpy according to the cooling operation or the heating operation. According to one embodiment, the air conditioning capacity may be obtained by a product of the enthalpy difference and the circulation amount of refrigerant like in above-described Formula 3 and 4.

When the air condition capacity is obtained, efficiency corresponding to the air conditioning capacity may be obtained (3003). For example, the efficiency may be obtained based on a ratio of the air conditioning capacity to power (or power consumption). The efficiency may be experimentally or empirically obtained from the air conditioning capacity using a table or a graph.

When the efficiency is calculated, a control signal corresponding to the efficiency may be generated (3004).

For example, a control signal for controlling at least one of the first pressure and the second pressure may be generated based on at least one of the air conditioning capacity and efficiency. In this case, when the air conditioner performs the cooling operation, a control signal for controlling the second pressure is generated, and when the air conditioner performs the heating operation, a control signal for controlling the first pressure may be generated.

For another example, when the efficiency is lower than reference efficiency, the outdoor unit fan starts an operation, or the outdoor unit fan is rotated at a relatively higher angular speed, and thus a control signal may be generated.

Further, spatial efficiency data may be generated and stored using at least one of the air conditioning capacity and efficiency. When the spatial efficiency data is generated and stored, the degradation of the air conditioner or each component of the air conditioner may be periodically or aperiodically monitored based on the spatial efficiency data. Further, a maintenance plan for the air conditioner may be set based on a monitoring and storage result as described above.

Further, when the air conditioner includes a plurality of outdoor units, at least one of the air conditioning capacity and efficiency for each outdoor unit are compared, and a different control signal for each outdoor unit may be generated based on the comparison result. For example, an outdoor unit to be operated from the plurality of outdoor units is determined, or the quantity of outdoor units to be operated is determined, and at least one of the plurality of outdoor units may be controlled based on the determined result.

Further, a priority for each outdoor unit may be set according to the comparison result of at least one of the air conditioning capacity and efficiency of each outdoor unit. Generation and transmission of the control signal for each outdoor unit is determined according to the set priority.

The method of controlling the air conditioner according to the above-described embodiment may be formed as a program to be operated by various computers. The program may include a program command, a data file, and a data structure, and/or combinations thereof. The program may be produced using a machine code or a high-level language code. The program may be specially designed to perform a method of controlling the above-described air conditioner or may be formed using available well-known various functions or definitions for those skilled in the field of computer software.

The program for performing the method of controlling the air conditioner may be recorded on a computer readable record medium. The computer readable recording medium may include various types of hardware devices in which a specific program performed according to a call of the computer is stored, for example, a magnetic disk recording disk, such as a hard disk or a floppy disk, an optical media, such as a magnetic tape, a compact disk (CD), or a digital video disc (DVD), a magneto-optical media, such as a floptical disk, and a semiconductor storing device such as a ROM, a RAM, or a flash memory, and the like.

As is apparent from the above description, an air conditioner and a method for controlling the air conditioner allow a cooling capacity or heating capacity of the air conditioner to be quickly and appropriately determined, and allow the air conditioner to be more efficiently and effectively operated by being controlled based on the determined cooling capacity or heating capacity.

Further, according to the above-described air conditioner and method for controlling the air conditioner, the cooling or heating capacity of the air conditioner in an actual structure or device is directly calculated and obtained, and thus the air conditioner can be conveniently managed.

According to the above-described air conditioner and method for controlling the air conditioner, the actual cooling or heating capacity of the air conditioner is continuously monitored, and thus maintenance and repair of the air conditioner can be more efficiently and reasonably planned.

Although embodiments of the air conditioner and the method of controlling the air conditioner have been described, the air conditioner and the method of controlling the air conditioner are not limited to only the above-described embodiments. The embodiments to be implemented by being modified and changed by those skilled in the art based on the above-described embodiments may be also examples of the above-described air conditioner and the method of controlling the air conditioner. For example, when the described technologies are performed in orders different from the described methods, and/or the described components such as a system, a structure, a device and a circuit are coupled or combined in the form different from the described method, or replaced or substituted with other components or equivalents, a result which is the same as or similar to that of the above-described air conditioner and the method of controlling the air conditioner may be obtained.

What is claimed is:

1. An air conditioner comprising:
    an air conditioning unit including
        a compressor,
        a first heat exchanger,
        an expansion valve, and
        a second heat exchanger; and
    a controller configured to
        obtain enthalpy of a refrigerant flowing in the air conditioning unit,
        obtain an air conditioning capacity using a circulation amount of the refrigerant and the obtained enthalpy of the refrigerant,
        obtain efficiency based on the obtained air conditioning capacity and supplied power, and
        control the air conditioning unit according to the obtained efficiency,
    wherein the controller calculates and obtains the circulation amount of the refrigerant using a first pressure of a refrigerant discharged from the compressor of the air conditioning unit, a second pressure of a refrigerant supplied to the compressor, a first temperature of the refrigerant supplied to the compressor, a second temperature of the refrigerant discharged from the compressor, an overcooling temperature, and a rotation frequency of the compressor.

2. The air conditioner according to claim 1, wherein the controller determines whether an operation of the air conditioner is a cooling operation or a heating operation.

3. The air conditioner according to claim 2, wherein:
    when determining that the operation of the air conditioning unit is the cooling operation, the obtained enthalpy of the refrigerant includes enthalpy of a refrigerant supplied to the second heat exchanger and enthalpy of a refrigerant discharged from the second heat exchanger; and
    when determining that the operation of the air conditioning unit is the heating operation, the obtained enthalpy of the refrigerant includes enthalpy of a refrigerant supplied to the first heat exchanger and enthalpy of a refrigerant discharged from the first heat exchanger.

4. The air conditioner according to claim 1, wherein the controller controls the efficiency of the air conditioning unit by controlling at least one of a first pressure of a refrigerant discharged from the compressor and a second pressure of a refrigerant supplied to the compressor according to the obtained efficiency.

5. The air conditioner according to claim 4, wherein the controller controls at least one of the first pressure and the second pressure further using indoor moisture.

6. The air conditioner according to claim 1, wherein:
    the air conditioning unit further includes a fan configured to guide heat generated in the first heat exchanger to the outside; and
    the controller further increases a rotation number of the fan when the efficiency is relatively decreased.

7. The air conditioner according to claim 1, wherein the controller obtains the efficiency at least one point and stores the obtained efficiency at the at least one point in a storage unit.

8. The air conditioner according to claim 7, wherein the controller determines a maintenance plan of the air conditioning unit based on the obtained efficiency at the at least one point.

* * * * *